(12) United States Patent
Loberg

(10) Patent No.: US 9,245,064 B2
(45) Date of Patent: Jan. 26, 2016

(54) SECURELY SHARING DESIGN RENDERINGS OVER A NETWORK

(75) Inventor: Barrie A. Loberg, Millarville (CA)

(73) Assignee: ICE EDGE BUSINESS SOLUTIONS, Calgary (CA)

(*) Notice: Subject to any disclaimer, the term of this patent is extended or adjusted under 35 U.S.C. 154(b) by 0 days.

(21) Appl. No.: 13/510,912

(22) PCT Filed: Nov. 24, 2010

(86) PCT No.: PCT/US2010/058092
§ 371 (c)(1),
(2), (4) Date: May 18, 2012

(87) PCT Pub. No.: WO2011/066452
PCT Pub. Date: Jun. 3, 2011

(65) Prior Publication Data
US 2012/0268463 A1    Oct. 25, 2012

Related U.S. Application Data

(60) Provisional application No. 61/264,219, filed on Nov. 24, 2009.

(51) Int. Cl.
*G06F 17/50* (2006.01)

(52) U.S. Cl.
CPC ........ *G06F 17/5004* (2013.01); *G06F 2217/04* (2013.01)

(58) Field of Classification Search
CPC ............ G06F 2217/00; G06F 2217/04; G06F 17/5004; G06F 17/50; G06F 2217/10; G06F 2217/06; G06F 17/5095; G06T 17/20; G06T 19/00; G06T 15/10; G06T 17/10; G06T 19/20; G06T 19/003; G06T 2219/2021; G06T 2210/04; G06T 15/40; Y10S 715/964; Y02T 10/82
See application file for complete search history.

(56) References Cited

U.S. PATENT DOCUMENTS

| | | | | |
|---|---|---|---|---|
| 4,586,145 A | * | 4/1986 | Bracewell | G01C 11/06 359/462 |
| 4,862,376 A | * | 8/1989 | Ferriter | G06F 17/50 700/107 |

(Continued)

FOREIGN PATENT DOCUMENTS

| | | |
|---|---|---|
| EP | 1098244 | 9/2001 |
| EP | 1204046 | 5/2002 |

(Continued)

OTHER PUBLICATIONS

Blythe, Rise of the Graphics Processor, IEEE, 2008.*

(Continued)

*Primary Examiner* — Phi Hoang
*Assistant Examiner* — Charles L Beard
(74) *Attorney, Agent, or Firm* — Workman Nydegger

(57) ABSTRACT

Systems, methods, and design software allow for easy and efficient rendering, displaying, navigation, and/or sharing of computer generated designs and models. One or more implementations allow a user to share the geometry and the graphical attributes of a three-dimensional model without sharing the source file or the proprietary details of the source file. In particular, the one or more implementations provide the ability to capture the geometry and the graphical attributes of a three-dimensional model, and share then captured geometry with others. Furthermore, one or more implementations can allow for sharing of the geometry and graphical attributes of a three-dimensional model without requiring the viewer to have the software used to create the three-dimensional model.

26 Claims, 10 Drawing Sheets

(56) References Cited

U.S. PATENT DOCUMENTS

| | | | |
|---|---|---|---|
| 5,111,392 A | 5/1992 | Malin | |
| 5,255,207 A | 10/1993 | Cornwell | |
| 5,293,479 A | 3/1994 | Quintero et al. | |
| 5,339,247 A * | 8/1994 | Kirihara | G06T 17/00 700/106 |
| 5,414,801 A * | 5/1995 | Smith | G06T 15/10 345/157 |
| 5,514,232 A | 5/1996 | Burns | |
| 5,555,357 A | 9/1996 | Fernandes | |
| 5,572,639 A | 11/1996 | Gantt | |
| 5,576,965 A | 11/1996 | Akasaka | |
| 5,588,098 A | 12/1996 | Chen et al. | |
| 5,625,827 A | 4/1997 | Krause | |
| 5,684,713 A | 11/1997 | Asada et al. | |
| 5,740,341 A * | 4/1998 | Oota et al. | 345/420 |
| 5,764,241 A * | 6/1998 | Elliott et al. | 345/473 |
| 5,764,518 A | 6/1998 | Collins | |
| 5,870,771 A | 2/1999 | Oberg | |
| 5,894,310 A | 4/1999 | Arsenault et al. | |
| 5,918,232 A * | 6/1999 | Pouschine et al. | |
| 5,977,982 A | 11/1999 | Lauzon | |
| 5,995,107 A * | 11/1999 | Berteig et al. | 345/420 |
| 6,014,503 A | 1/2000 | Nagata | |
| 6,020,885 A * | 2/2000 | Honda | 715/757 |
| 6,037,945 A | 3/2000 | Loveland | |
| 6,052,669 A | 4/2000 | Smith | |
| 6,253,167 B1 * | 6/2001 | Matsuda et al. | 703/11 |
| 6,292,810 B1 | 9/2001 | Richards | |
| 6,295,513 B1 * | 9/2001 | Thackston | 703/1 |
| 6,335,732 B1 * | 1/2002 | Shaikh | G06T 15/40 345/421 |
| 6,401,237 B1 * | 6/2002 | Ishikawa | 717/113 |
| 6,459,435 B1 | 10/2002 | Eichel | |
| 6,466,239 B2 * | 10/2002 | Ishikawa | 715/850 |
| 6,483,508 B1 * | 11/2002 | Ishikawa | G06T 19/20 345/420 |
| 6,493,679 B1 | 12/2002 | Rappaport | |
| 6,509,906 B1 | 1/2003 | Awe et al. | |
| 6,570,563 B1 * | 5/2003 | Honda | 345/419 |
| 6,662,144 B1 | 12/2003 | Normann et al. | |
| 6,690,981 B1 | 2/2004 | Kawachi | |
| 6,701,288 B1 | 3/2004 | Normann | |
| 6,721,684 B1 | 4/2004 | Saebi | |
| 6,772,168 B2 | 8/2004 | Ardoin et al. | |
| 6,888,542 B1 | 5/2005 | Clauss | |
| 6,922,701 B1 | 7/2005 | Ananian et al. | |
| 6,944,513 B1 * | 9/2005 | Tomomitsu | G06F 17/5004 345/418 |
| 6,971,063 B1 | 11/2005 | Rappaport | |
| 6,985,832 B2 | 1/2006 | Saebi | |
| 6,999,102 B2 | 2/2006 | Felser et al. | |
| 7,019,753 B2 | 3/2006 | Rappaport | |
| 7,042,440 B2 | 5/2006 | Pryor et al. | |
| 7,062,454 B1 | 6/2006 | Giannini | |
| 7,062,532 B1 * | 6/2006 | Sweat | G06Q 10/06 709/205 |
| 7,062,722 B1 | 6/2006 | Carlin et al. | |
| 7,065,420 B1 | 6/2006 | Philpott | |
| 7,079,990 B2 * | 7/2006 | Haller | G05B 19/41805 345/420 |
| 7,080,096 B1 | 7/2006 | Imamura | |
| 7,085,697 B1 | 8/2006 | Rappaport | |
| 7,096,173 B1 | 8/2006 | Rappaport | |
| 7,139,686 B1 * | 11/2006 | Critz | G06F 17/5009 703/13 |
| 7,155,228 B2 | 12/2006 | Rappaport | |
| 7,171,208 B2 | 1/2007 | Rappaport | |
| 7,171,344 B2 * | 1/2007 | Lind | G06F 17/5009 700/98 |
| 7,200,639 B1 * | 4/2007 | Yoshida | 709/208 |
| 7,216,092 B1 | 5/2007 | Weber | |
| 7,218,979 B2 * | 5/2007 | Tsuji | G06F 17/50 700/182 |
| 7,243,054 B2 | 7/2007 | Rappaport | |
| 7,246,044 B2 * | 7/2007 | Imamura et al. | 703/1 |
| 7,246,045 B1 | 7/2007 | Rappaport | |
| 7,249,005 B2 | 7/2007 | Loberg | |
| 7,266,768 B2 | 9/2007 | Ferlitsch | |
| 7,277,572 B2 * | 10/2007 | MacInnes et al. | 382/154 |
| 7,277,830 B2 | 10/2007 | Loberg | |
| 7,299,168 B2 | 11/2007 | Rappaport | |
| 7,299,416 B2 | 11/2007 | Jaeger | |
| 7,318,063 B2 * | 1/2008 | Brychell | G06F 17/30917 707/954 |
| 7,337,093 B2 * | 2/2008 | Ramani et al. | 703/1 |
| 7,340,383 B2 * | 3/2008 | Mayuzumi et al. | 703/7 |
| 7,353,192 B1 * | 4/2008 | Ellis et al. | 705/26.5 |
| 7,392,522 B2 * | 6/2008 | Murray | G06F 9/44526 717/174 |
| 7,430,711 B2 * | 9/2008 | Rivers-Moore | G06F 17/248 715/221 |
| 7,437,376 B2 * | 10/2008 | Sikchi | G06F 17/243 |
| 7,444,195 B2 * | 10/2008 | Smith | G06F 17/5095 345/420 |
| 7,479,959 B2 * | 1/2009 | Han | G06T 19/00 345/420 |
| 7,492,934 B2 * | 2/2009 | Mundy | A61B 6/032 382/100 |
| 7,516,399 B2 * | 4/2009 | Hsu | G06F 17/2247 715/234 |
| 7,587,302 B2 * | 9/2009 | Arvin et al. | 703/2 |
| 7,620,638 B2 * | 11/2009 | Nonclercq | G06F 17/50 |
| 7,629,985 B2 * | 12/2009 | McArdle | G06T 19/00 345/619 |
| 7,643,027 B2 * | 1/2010 | Rothstein | G06T 17/10 345/420 |
| 7,643,966 B2 | 1/2010 | Adachi | |
| 7,661,959 B2 | 2/2010 | Green | |
| 7,676,348 B2 | 3/2010 | Okada | |
| 7,761,266 B2 * | 7/2010 | Mangon | G06F 17/5004 345/419 |
| 7,788,068 B2 * | 8/2010 | Mangon | G06F 17/5004 703/1 |
| 7,814,436 B2 * | 10/2010 | Schrag et al. | 715/851 |
| 7,822,584 B1 | 10/2010 | Saebi | |
| 7,823,074 B2 * | 10/2010 | Takemura et al. | 715/757 |
| 7,856,342 B1 * | 12/2010 | Kfouri et al. | 703/1 |
| 7,877,237 B1 | 1/2011 | Saebi | |
| 7,996,756 B2 * | 8/2011 | Eilers et al. | 715/205 |
| 8,065,654 B2 * | 11/2011 | Shiihara | G06F 17/5045 700/107 |
| 8,108,267 B2 * | 1/2012 | Varon | 705/26.5 |
| 8,117,558 B2 * | 2/2012 | Hoguet | G06Q 30/0601 382/282 |
| 8,132,123 B2 * | 3/2012 | Schrag et al. | 715/851 |
| 8,134,553 B2 * | 3/2012 | Saini et al. | 345/419 |
| 8,185,219 B2 * | 5/2012 | Gilbert et al. | 700/83 |
| 8,195,434 B2 * | 6/2012 | Powell | G06T 17/20 703/2 |
| 8,244,025 B2 * | 8/2012 | Davis et al. | 382/154 |
| 8,255,338 B1 | 8/2012 | Brittan | |
| 8,271,336 B2 | 9/2012 | Mikurak | |
| 8,276,088 B2 | 9/2012 | Ke | |
| 8,285,707 B2 | 10/2012 | Day | |
| 8,290,849 B2 | 10/2012 | Eisler | |
| 8,301,527 B2 | 10/2012 | Tarbox | |
| 8,314,799 B2 * | 11/2012 | Pelletier et al. | 345/474 |
| 8,326,926 B2 * | 12/2012 | Sangem et al. | 709/204 |
| 8,332,401 B2 | 12/2012 | Hull | |
| 8,332,827 B2 | 12/2012 | Edde | |
| 8,334,867 B1 * | 12/2012 | Davidson | G06F 3/04815 345/419 |
| 8,335,789 B2 | 12/2012 | Hull | |
| 8,352,218 B2 * | 1/2013 | Balla et al. | 703/1 |
| 8,386,918 B2 | 2/2013 | Do | |
| RE44,054 E | 3/2013 | Kim | |
| 8,402,473 B1 | 3/2013 | Becker | |
| 8,423,391 B2 | 4/2013 | Hessedenz | |
| 8,442,850 B2 | 5/2013 | Schorr | |
| 8,462,147 B2 * | 6/2013 | Sugden | 345/419 |
| 8,468,175 B2 * | 6/2013 | Obata | G06F 9/45537 707/802 |
| 8,499,250 B2 * | 7/2013 | Wetzer et al. | 715/769 |
| 8,508,539 B2 * | 8/2013 | Vlietinck | 345/502 |

(56) References Cited

U.S. PATENT DOCUMENTS

| | | | |
|---|---|---|---|
| 8,510,382 B2 | 8/2013 | Purdy | |
| 8,510,672 B2* | 8/2013 | Loberg | 715/771 |
| 8,533,596 B2* | 9/2013 | Boss et al. | 715/706 |
| 8,572,558 B1* | 10/2013 | Mathieu, III | G06F 9/45512 717/107 |
| 8,583,375 B2* | 11/2013 | Baule | G06F 17/5004 702/1 |
| 8,600,989 B2 | 12/2013 | Hull | |
| 8,626,877 B2 | 1/2014 | Greene | |
| 8,645,973 B2 | 2/2014 | Bosworth | |
| 8,650,179 B2 | 2/2014 | Driesch | |
| 8,763,009 B2* | 6/2014 | Degirmenci | G06F 9/542 715/804 |
| 8,773,426 B1* | 7/2014 | Hamel | G06T 15/40 345/419 |
| 8,819,072 B1* | 8/2014 | Croicu | G06F 17/30011 707/796 |
| 8,914,259 B2* | 12/2014 | Kripac | G06T 17/30 345/420 |
| 8,933,925 B2* | 1/2015 | Sinha | G06T 7/0065 345/419 |
| 8,949,789 B2* | 2/2015 | Schlarb | G06Q 10/06 707/600 |
| 8,954,295 B1* | 2/2015 | Vicknair | G06T 17/10 703/1 |
| 8,994,726 B1* | 3/2015 | Furukawa | G06T 17/10 345/420 |
| 9,075,931 B2* | 7/2015 | Charles | G06F 17/50 |
| 9,106,425 B2* | 8/2015 | Murphey | G06F 21/10 |
| 9,117,308 B1* | 8/2015 | Nag | G06T 19/20 |
| 2001/0024211 A1* | 9/2001 | Kudukoli et al. | 345/763 |
| 2001/0024230 A1* | 9/2001 | Tsukahara | 348/42 |
| 2001/0047250 A1 | 11/2001 | Schuller | |
| 2001/0047251 A1* | 11/2001 | Kemp | G06F 17/5004 703/1 |
| 2002/0010589 A1* | 1/2002 | Nashida et al. | 704/275 |
| 2002/0046294 A1* | 4/2002 | Brodsky | G06F 9/541 709/246 |
| 2002/0059049 A1* | 5/2002 | Bradbury et al. | 703/11 |
| 2002/0069221 A1 | 6/2002 | Rao | |
| 2002/0083076 A1 | 6/2002 | Wucherer | |
| 2002/0085041 A1* | 7/2002 | Ishikawa | G06T 15/10 715/804 |
| 2002/0091739 A1 | 7/2002 | Ferlitsch | |
| 2002/0093538 A1* | 7/2002 | Carlin | G06Q 30/02 715/778 |
| 2002/0095348 A1 | 7/2002 | Hiroshige | |
| 2002/0109704 A1* | 8/2002 | Rajarajan | G06T 15/00 345/619 |
| 2002/0144204 A1 | 10/2002 | Milner | |
| 2002/0158865 A1* | 10/2002 | Dye et al. | 345/419 |
| 2002/0188478 A1* | 12/2002 | Breeland et al. | 705/3 |
| 2002/0188678 A1* | 12/2002 | Edecker et al. | 709/204 |
| 2002/0196285 A1* | 12/2002 | Sojoodi et al. | 345/771 |
| 2003/0090530 A1* | 5/2003 | Ramani et al. | 345/848 |
| 2003/0097273 A1 | 5/2003 | Carpenter | |
| 2003/0128232 A1* | 7/2003 | Tsuji | G06F 17/50 715/736 |
| 2004/0012542 A1 | 1/2004 | Bowsher | |
| 2004/0027371 A1 | 2/2004 | Jaeger | |
| 2004/0098691 A1 | 5/2004 | Teig | |
| 2004/0117746 A1* | 6/2004 | Narain et al. | 716/4 |
| 2004/0145614 A1 | 7/2004 | Takagaki et al. | |
| 2004/0153824 A1* | 8/2004 | Devarajan et al. | 714/38 |
| 2004/0204903 A1 | 10/2004 | Saebi | |
| 2004/0205519 A1* | 10/2004 | Chapel et al. | 715/502 |
| 2004/0236561 A1 | 11/2004 | Smith | |
| 2005/0041028 A1 | 2/2005 | Coutts | |
| 2005/0065951 A1 | 3/2005 | Liston | |
| 2005/0071135 A1* | 3/2005 | Vredenburgh et al. | 703/1 |
| 2005/0081161 A1* | 4/2005 | MacInnes | G06F 17/5004 715/765 |
| 2005/0203718 A1 | 9/2005 | Carek | |
| 2005/0228250 A1* | 10/2005 | Bitter et al. | 600/407 |
| 2005/0256874 A1* | 11/2005 | Chiba et al. | 707/10 |
| 2006/0028695 A1 | 2/2006 | Knighton | |
| 2006/0041840 A1* | 2/2006 | Blair et al. | 715/513 |
| 2006/0041842 A1 | 2/2006 | Loberg | |
| 2006/0119601 A1* | 6/2006 | Finlayson et al. | 345/427 |
| 2006/0143220 A1* | 6/2006 | Spencer, Jr. | G06F 8/20 |
| 2006/0174209 A1 | 8/2006 | Barros | |
| 2006/0206623 A1* | 9/2006 | Gipps et al. | 709/238 |
| 2006/0271378 A1 | 11/2006 | Day | |
| 2007/0088704 A1* | 4/2007 | Bourne et al. | 707/10 |
| 2007/0097121 A1* | 5/2007 | Loop et al. | 345/428 |
| 2007/0115275 A1* | 5/2007 | Cook et al. | 345/418 |
| 2007/0130020 A1* | 6/2007 | Paolini | 705/26 |
| 2007/0168325 A1* | 7/2007 | Bourne et al. | 707/2 |
| 2007/0180425 A1* | 8/2007 | Storms et al. | 717/104 |
| 2007/0188488 A1* | 8/2007 | Choi | 345/419 |
| 2007/0204241 A1 | 8/2007 | Glennie et al. | |
| 2007/0219645 A1 | 9/2007 | Thomas | |
| 2007/0240049 A1 | 10/2007 | Rogerson | |
| 2007/0250295 A1 | 10/2007 | Murray | |
| 2007/0260432 A1 | 11/2007 | Okada | |
| 2007/0271870 A1* | 11/2007 | Mifsud et al. | 52/745.2 |
| 2007/0294622 A1* | 12/2007 | Sterner et al. | 715/716 |
| 2008/0010382 A1* | 1/2008 | Ratakonda et al. | 709/231 |
| 2008/0033641 A1* | 2/2008 | Medalia | 701/209 |
| 2008/0036769 A1 | 2/2008 | Coutts | |
| 2008/0052618 A1* | 2/2008 | McMillan et al. | 715/249 |
| 2008/0071559 A1* | 3/2008 | Arrasvuori | G06Q 30/06 705/26.1 |
| 2008/0112610 A1* | 5/2008 | Israelsen et al. | 382/154 |
| 2008/0126021 A1* | 5/2008 | Hoguet | 703/1 |
| 2008/0140732 A1* | 6/2008 | Wilson et al. | 707/201 |
| 2008/0141334 A1* | 6/2008 | Wicker et al. | 726/1 |
| 2008/0143884 A1 | 6/2008 | Foster | |
| 2008/0174598 A1* | 7/2008 | Risenhoover | 345/419 |
| 2008/0188969 A1 | 8/2008 | O'Malley | |
| 2008/0238946 A1* | 10/2008 | Baughman | 345/661 |
| 2008/0249756 A1* | 10/2008 | Chaisuparasmikul | 703/13 |
| 2008/0252640 A1* | 10/2008 | Williams | G06T 19/003 345/420 |
| 2008/0275674 A1 | 11/2008 | Reghetti et al. | |
| 2008/0282166 A1* | 11/2008 | Fillman et al. | 715/719 |
| 2008/0303844 A1 | 12/2008 | Reghetti et al. | |
| 2008/0309678 A1 | 12/2008 | Reghetti et al. | |
| 2009/0069704 A1* | 3/2009 | MacAdam et al. | 600/523 |
| 2009/0089186 A1* | 4/2009 | Paolini | 705/27 |
| 2009/0110307 A1* | 4/2009 | Markowitz | G06T 17/10 382/232 |
| 2009/0113349 A1* | 4/2009 | Zohar et al. | 715/852 |
| 2009/0119039 A1 | 5/2009 | Banister | |
| 2009/0138826 A1* | 5/2009 | Barros | 715/841 |
| 2009/0148050 A1 | 6/2009 | Reghetti et al. | |
| 2009/0187385 A1 | 7/2009 | Zegdoun | |
| 2009/0198358 A1* | 8/2009 | Logan | G06F 17/30053 700/94 |
| 2009/0208095 A1* | 8/2009 | Zebedin | G06T 7/0081 382/154 |
| 2009/0210487 A1* | 8/2009 | Westerhoff et al. | 709/203 |
| 2009/0248184 A1* | 10/2009 | Steingart et al. | 700/98 |
| 2009/0254843 A1* | 10/2009 | Van Wie et al. | 715/757 |
| 2009/0273598 A1 | 11/2009 | Reghetti et al. | |
| 2009/0313322 A1* | 12/2009 | Sheehan | H04L 67/02 709/203 |
| 2010/0017733 A1* | 1/2010 | Barros | 715/766 |
| 2010/0042516 A1* | 2/2010 | Knipfer | G06Q 10/0875 705/29 |
| 2010/0121614 A1 | 5/2010 | Reghetti et al. | |
| 2010/0122196 A1* | 5/2010 | Wetzer et al. | 715/769 |
| 2010/0138762 A1 | 6/2010 | Reghetti et al. | |
| 2010/0179788 A1* | 7/2010 | Santina | G06F 17/5004 703/1 |
| 2010/0185514 A1* | 7/2010 | Glazer et al. | 705/14.51 |
| 2010/0198563 A1* | 8/2010 | Plewe | G06F 17/5004 703/1 |
| 2010/0302245 A1* | 12/2010 | Best | 345/426 |
| 2011/0007069 A1* | 1/2011 | Lee | G06Q 30/0603 345/419 |
| 2011/0063440 A1* | 3/2011 | Neustaedter et al. | 348/143 |
| 2011/0078169 A1* | 3/2011 | Sit | 707/769 |
| 2011/0169826 A1* | 7/2011 | Elsberg et al. | 345/419 |

(56) References Cited

U.S. PATENT DOCUMENTS

| | | | | |
|---|---|---|---|---|
| 2011/0258573 A1* | 10/2011 | Wetzer et al. | | 715/775 |
| 2011/0320966 A1* | 12/2011 | Edecker et al. | | 715/757 |
| 2012/0005353 A1* | 1/2012 | Edecker et al. | | 709/227 |
| 2012/0069011 A1* | 3/2012 | Hurt et al. | | 345/419 |
| 2012/0089374 A1* | 4/2012 | Kripac | | G06T 17/30 703/1 |
| 2012/0331061 A1* | 12/2012 | Lininger | | G06F 17/5004 709/205 |
| 2012/0331422 A1* | 12/2012 | High | | 715/849 |
| 2013/0125029 A1* | 5/2013 | Miller | | G06F 9/45529 715/760 |
| 2013/0257850 A1* | 10/2013 | Chen | | G06T 19/20 345/419 |
| 2013/0283362 A1* | 10/2013 | Kress | | G06F 21/44 726/7 |
| 2014/0095122 A1* | 4/2014 | Appleman | | G06F 17/5004 702/1 |

FOREIGN PATENT DOCUMENTS

| | | |
|---|---|---|
| GB | 2364801 | 2/2002 |
| JP | 10334127 | 12/1998 |
| JP | 2005301630 | 10/2005 |
| WO | 9003618 | 4/1990 |
| WO | 9322741 | 11/1993 |
| WO | 0219177 | 3/2002 |
| WO | WO02075597 | 9/2002 |
| WO | 03023559 | 3/2003 |
| WO | 2005033985 | 4/2005 |
| WO | 2006018744 | 2/2006 |
| WO | 2007093060 | 8/2007 |
| WO | 2007106873 | 9/2007 |
| WO | 2006018740 | 2/2009 |
| WO | 2009100538 A1 | 8/2009 |

OTHER PUBLICATIONS

U.S. Office of Personnel Management, Clear Cache IE, 2007.*
Wang, Intellectual Property Pertection in Collaborative Design through Lean Information Modeling and Sharing, 2006.*
Lea, Community Place Architecture and Performance, 2007.*
Autodesk, Maya 8.5 Shading, 2007.*
CRC, Final Report Collaoration Platform, 2009.*
Mental Images GmbH, RealityServer Functional Overview White Paper, 2007.*
Rozansk, Software Systems Architecture Working With Stakeholders Using Viewpoints and Perspectives, 2008.*
Sony, Community Place Conductor 2.0 Users Manua, 1998.*
Vasko, Collaborative Modeling of Web Applications for Various Stakeholders, 2009.*
Wollongong, City Centre 3D Model Specifications, May 18, 2009.*
Office Action mailed Oct. 18, 2006 (Paper No. 20060925), U.S. Appl. No. 11/204,419, filed Aug. 16, 2005.
Office Action mailed Oct. 19, 2006 (Paper No. 20061012), U.S. Appl. No. 11/204,420, filed Aug. 16, 2005.
Chan, et al.: "Design of a Walkthrough System for Indoor Environments from Floor Plans"; Proceedings of the 1998 IEEE Conference on Information Visualization, Jul. 29-31, 1998, pp. 50-57.
Josie Wernecke; Title: The Inventor Mentor: Programming Object Oriented 3D Graphics with Open Inventor; Release 2; Date: Jun. 19, 1997; Published on Web Site: www.cs.ualberta.cal.

Office Action Mailed Nov. 28, 2007, U.S. Appl. No. 11/204,421.
Office Action Mailed Aug. 11, 2008, U.S. Appl. No. 11/204,421.
Office Action Mailed Dec. 23, 2008, U.S. Appl. No. 11/204,421.
Office Action Mailed Mar. 31, 2009, U.S. Appl. No. 11/204,421.
Office Action Mailed May 15, 2009, U.S. Appl. No. 11/204,421.
Office Action Mailed Jul. 29, 2009, U.S. Appl. No. 11/204,421.
International Search Report and Opinion on PCT/CA2007/000241, mailed May 15, 2007.
International Search Report and Opinion on PCT/CA2009/000190, mailed Jun. 5, 2009.
International Search Report and Opinion on PCT/CA2009/000183, mailed Jun. 9, 2009.
International Search Report and Opinion on PCT/CA2009/000311, mailed Jul. 30, 2009.
Office Action Mailed Aug. 18, 2010, U.S. Appl. No. 11/577,302.
USPTO, Office Action in U.S. Appl. No. 121444,886, mailed Oct. 27, 2011, 24 pages.
Advisory Action Mailed Mar. 31, 2009, U.S. Appl. No. 11/204,421.
Advisory Action Mailed May 15, 2009, U.S. Appl. No. 11/204,421.
USPTO, Office Action in U.S. Appl. No. 121444,890, mailed Oct. 27, 2011, 30 pages.
USPTO, Office Action in U.S. Appl. No. 12/444,886, mailed Aug. 16, 2012.
International Search Report for PCT/CA2009000190 mailed Apr. 12, 2012.
USPTO, Office Action in U.S. Appl. No. 12/444,893 mailed Feb. 19, 2013.
Gross M D: "Why can't CAD be more like Lego? CKB, a program for building constructions kits", Automation in Construction, Elsevier Science Publishers, Amsterdam, NL, vol. 5, No. 4, Oct. 1, 1996 pp. 285-300, XP004072247, ISSN: 0926-5805, DOI:10.1016/S0926-5805(96)00154-9.
European Search Report—Application No./U.S. Pat. No. 09719352. 8-1960 / 2252951 PCT/CA2009000311.
EPO Search Report for EP07701791 dated Aug. 21, 2012.
International Search Report and Witten Opinion for PCT/US2012/038582 mailed Dec. 28, 2012.
Gajamani, Geetha., "Automated Project Scheduling and Inventory Monitoring Using RFID", 2007, 24th Internationial Symposium on Automation and Robiotics in Construction. Retrieved from http://www.iaarc.org/publications/proceedings_of_the_24th_isarc/automated_project_schedule_and_inventory_monitoring_using_rfid.html.
European Search Report—Application No. 10 833 972.2 mailed Feb. 2, 2015.
Notice of Allowance for U.S. Appl. No. 13/579,261 mailed on Jul. 10, 2015.
European Search Report—Application No. 12800327.4 mailed Feb. 18, 2015.
Funkhouser T et al: Modeling by example, ACM Transactions on Grpahic (TOG), ACM, US, vol. 23, No. 3, Aug. 1, 2004, pp. 652-663, XP008087089, ISSN: 0730-0301, DOI: 10.1145/1015706.1015775 *abstract* *p. 652, col. 1, paragraph 2- col. 2, paragraph 2* *p. 656, col. 1, paragraph 3-5*.
Anonymous: "Dresden Frauenkirche—Wikipedia, the free encyclopedia", Jun. 8, 2011, pp. 1-7, XP055168540 retrieved from the Internet: URL: https://en.wikipedia.org/w/index.php?title=Dresden_Frauenkirche&oldid=433207596 [retrieved on Feb. 9, 2015] p. 3, paragraph 7-9*.

* cited by examiner

SECURELY SHARING DESIGN RENDERINGS OVER A NETWORK

CROSS-REFERENCE TO RELATED APPLICATIONS

This application is a U.S. National Stage Application corresponding to PCT/US10/58092, filed Nov. 24, 2010, which claims the benefit of priority to U.S. Provisional Patent Application No. 61/264,219, filed Nov. 24, 2009, the entire content of which are incorporated herein by reference.

BACKGROUND OF THE INVENTION

1. The Field of the Invention

The present invention relates generally to computer-aided design or drafting software.

2. Background and Relevant Art

Many industries use computer-aided design ("CAD") software (such as AUTOCAD, REVIT, 3DS MAX, SKETCHUP) to design and create three-dimensional computer models. Increasingly, users of conventional design software utilize this software to display three-dimensional models to clients, investors, and other individuals. The conventional focus of many conventional design software programs is on designing and creating three-dimensional computer models, and not on displaying, navigating, and sharing the three-dimensional models. As such, some conventional design software programs make displaying, navigating, and sharing the three-dimensional models difficult, inefficient, or ineffective.

For example, some conventional design software may render three-dimensional models for display that do not have a realistic appearance. In particular, the version of the three-dimensional model rendered by the conventional design software may not incorporate the full details of the three-dimensional model. For example, the rendered version of the model may not include details such as shading, color, finish, and transparency. Conventional design software that is able to create a realistic appearance by rendering and displaying sufficient details of a three-dimensional model can tend to require an excessive amount of computing power and time to display and navigate.

In addition, the navigational control tools that some conventional design software programs use to view three-dimensional models may not be natural or intuitive. The absence of intuitive navigational control tools in some conventional design software can make viewing and appreciating all aspects of a three-dimensional design difficult or time consuming. One will appreciate that the lack intuitive navigational control tools can make it particularly difficult for a person unfamiliar with the software (i.e., clients, investors) to navigate a three-dimensional model quickly and effectively.

Conventional design software can also have limited ability to share three-dimensional models with individuals that are not in the same location as the designer. For example, some conventional design software requires the designer to save or export the model into a file and send file (e.g., by email) to a desired viewer. The size alone of some three-dimensional model files can make transferring and sharing of the model difficult.

Additionally, in order to open and view the three-dimensional model file, the viewer is often required to own and have installed on his or her computer the same software as the designer. Often, it is not practical for all desired viewers of a particular design to have the same design software. This is due, in part, to the fact that conventional design software can be rather expensive, the viewer may not be in the design business, or the viewer simply prefers a brand of design software that is not the same as the designer's.

Furthermore, even in the event that the desired viewer has the same design software as the designer, the designer may not want to provide others with a digital copy of the three-dimensional model. For instance, when sharing a three-dimensional model using some conventional design software, the saved or exported computer design file can contain the visual aspects of the design as well as proprietary data concerning the design. One will appreciate that sharing all of the data associated with a three-dimensional model can be undesirable because the data could easily be misappropriated by a viewer. Moreover, the viewer may also have the ability to make edits to the design data, thereby changing the design and the designer's original intent.

In order to avoid the security risks associated with conventional design software, including those identified above, many designers resort to simply capturing a limited number of selected static views of a three-dimensional model. In some cases, these views can be combined into a video file. The designers might then provide copies of the static views or the video file, either electronically or by hard copy, to the desired viewers. While sharing static images or a video of a three-dimensional model may resolve some of the complications and risks associated with conventional design software, there can be drawbacks with sharing only certain views of a three-dimensional model. For example, the viewer cannot navigate through the three-dimensional model and see all of the different angles and lines that would be possible with a three-dimensional computer model.

According, there are a number of problems in the art that can be addressed.

BRIEF SUMMARY OF THE INVENTION

Implementations of the present invention overcome one or more problems in the art with systems, methods, and apparatus configured to allow easy and efficient rendering, displaying, navigation, and/or sharing of computer generated designs and models. In particular, one or more implementations of the present invention provide the ability to capture the geometry and the graphical attributes of a three-dimensional model. One or more implementations also allow for easy and intuitive navigation of the captured geometry. Additionally, one or more implementations allow a user to share the geometry and the graphical attributes of a three-dimensional model without sharing the source file or proprietary details of the source file. Furthermore, one or more implementations can allow for sharing of the geometry and graphical attributes of a three-dimensional model without requiring the viewer to have the software used to create the three-dimensional model.

For example, a computer program storage product can have computer-executable instructions stored thereon that, when executed, cause one or more processors to perform acts of identifying one or more files corresponding to a three-dimensional computer model created by a design software application and stored within a database associated with the design software application. The acts can additionally involve identifying geometry data and graphical aspect data of the three-dimensional computer model in the one or more files. Additionally, the acts can involve extracting the geometry data and graphical aspect data from the one or more files corresponding to the three-dimensional computer model. Also, the acts can involve storing the geometry data and graphical aspect data in a storage module unassociated with the design software application. Furthermore, the acts can involve providing an accurate three-dimensional view of the geometry and graphical aspects of the three-dimensional computer model at a display device using a capture and render software application unassociated with the design software application.

Additionally, a method from the perspective of a web server can involve receiving, from a first remote client computer system, geometry data and graphical aspect data extracted from a three-dimensional computer model created using a design software application. The method can also involve storing the geometry data and graphical aspect data in one or more geometric computer model files at a web server. Furthermore, the method can involve receiving one or more requests for the one or more geometric computer model files from a second remote client computer system. Also, the method can involve sending the one or more geometric computer model files and one or more viewer application files from the web server to the second remote client computer system. The one or more viewer application files can be configured to launch a temporary viewer application on the second remote client computer system. The temporary viewer application is configured to display the geometry data and graphical aspect data of the one or more geometric computer model files.

In addition to the foregoing, a method from the perspective of a client computer system can involve sending one or more requests to a web server for one or more geometric computer model files comprising geometry data and graphical aspect data extracted from a three-dimensional computer model created using a design software application. Also, the method can involve opening a temporary viewer application hosted by the web server. The method can additionally involve receiving the one or more geometric computer model files from the web server. Furthermore, the method can involve displaying an accurate three-dimensional view of the geometry and graphical aspects of the three-dimensional computer model at a display device using the temporary viewer application This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
FIG. 1 illustrates a schematic diagram of a computer model within an interface of an exemplary design software application with which an implementation of the present invention can integrate to capture the geometry of the computer model.

Implementations of the present invention extend to systems, methods, and apparatus configured to allow easy and efficient rendering, displaying, navigation, and/or sharing of computer generated designs and models. In particular, one or more implementations of the present invention provide the ability to capture the geometry and the graphical attributes of a three-dimensional model. One or more implementations also allow for easy and intuitive navigation of the captured geometry. Additionally, one or more implementations allow a user to share the geometry and the graphical attributes of a three-dimensional model without sharing the source file or proprietary details of the source file. Furthermore, one or more implementations can allow for sharing of the geometry and graphical attributes of a three-dimensional model without requiring the viewer to have the software used to create the three-dimensional model.

For example, at least one implementation relates to capturing the geometry and the graphical attributes of a three-dimensional computer model created using a design software application, such as, for example, REVIT, AUTOCAD, SKETCHUP, 3DS MAX ("design software"). The systems, software, and methods of the present invention can store the geometry and graphical aspects of the computer model as a geometric computer model file. In one or more implementations, the geometric computer model can include only the geometry and graphical aspects of the computer model. In other words, the geometric computer model may not include dimensional information, part information, or other work product information associated with the original computer model. Thus, as used herein, the term "geometric computer model" or "geometric computer model file" refers to a computer model and/or corresponding computer file containing substantially only the geometry and graphical aspects of a three-dimensional computer model created using design software, such as those mentioned above.

Once captured, the designer (as well as another user/viewer discussed hereinafter) can use a viewer application to explore the three-dimensional geometric computer model in a dynamically rendered virtual reality environment. The rendering techniques, in addition to the viewer interface, can allow the designer (or other user) to easily and effectively display and navigate the three-dimensional design. As explained in greater detail below, both the configuration of the geometric computer model and the viewer application can allow for seamless, intuitive navigation of a geometric computer model without requiring excessive computing power.

In addition, one or more implementations of the present invention allow the designer to securely share the geometric computer model over a network (such as a LAN, WAN, intranet, or the internet, etc.). For instance, implementations of the present invention can allow a designer to automatically publish the geometric computer model in a way that it is accessible by others through the network. Furthermore, implementations of the present invention can provide a temporary viewer application to allow for the display and navigation of the geometric computer model without requiring the design software used to create the original computer model. As used herein, a "temporary viewer application" refers to a viewer application unassociated with the design software used to create the original three-dimensional model, which is automatically installed and removed from a viewer's computer to allow secure viewing of captured geometry.

Although the viewer application can display and allow a viewer to navigate and explore the rendered geometric computer model, it is important to note that, in at least one implementation, the viewer application cannot change the three-dimensional model. Moreover, in such an implementation, the viewer does not have the original design file, which can contain proprietary and work product information the designer does not want to share with the viewer. Thus, one or more implementations can protect the designer's work product and intellectual property by making the work product otherwise inaccessible to the other users/viewers to whom the designer shares the model. This, in turn, enables the designer to freely share and show other viewers the three-dimensional model without fear they will misappropriate the design.

Referring now to the Figures, FIG. 1 depicts a schematic diagram of a three-dimensional computer model of a house 102 within an interface 100 of an exemplary design software application. As indicated above, some design software applications provide limited visualization and navigation capabilities without requiring large computing resources. For example, FIG. 1 shows a three-dimensional house rendering 102 that is displayed without shading, color, or other design details due to the fact that including such details may require excessive computer resources.

As mentioned above, implementations of the present invention can allow the designer to capture the geometry and graphical attributes of a three-dimensional computer model in a format that allows for efficient and effective display. In particular, one or more implementations provide a software plug-in configured to interact with the design software. The software plug-in can create an additional menu item or items in the design software. For example, FIG. 1 illustrates an additional menu item 104 within a tool bar 106 of the design software interface 100.

In one implementation, the menu item 104 created by the software plug-in can provide a drop-down selection that provides the designer with one or more options relating to the capture and rendering of the three-dimensional design. For example, the menu item 104 can include a selectable capture function that initiates the capture and/or rendering of the three-dimensional design. Additionally, the menu item can include other selectable functions such as "Link," which can initiate a bridge between the design software and the capture and render software application. The bridge can allow the capture and render software application to capture the geometry and graphical aspects from a three-dimensional computer model created by the design software.

An end user or designer can obtain the software plug-in described above through a variety of means. For example, the designer can download and/or install the software plug-in from an online source, such as a website. Of course, the designer can also install the software plug-in can from any other traditional means, such as a CD-ROM, a portable memory device, file sharing, etc. Moreover, the software plug-in can integrate with most, if not all, design software, including, but not limited to, those mentioned above. One will appreciate that the plug-in provided can be based upon the particular type of design software. Thus, the plug-in for REVIT can be different than the plug-in for 3DS MAX, etc.

Once the designer has installed the software plug-in on the designer's computer system, the designer can then capture a three-dimensional design in a format that allows for efficient and effective display. In one implementation of the invention, for example, the designer can first open the three-dimensional computer model 102 in an interface 100 of the design software used to create the design. The designer can then select the menu item 104 from the menu bar 106 that was added upon installing the software plug-in, and select a function. For example, the designer can select the "Capture" function 108, as shown in FIG. 1. Of course, in other implementations of the invention, the designer need not open the three-dimensional computer model 102; rather, the designer can select the three-dimensional computer model 102 based on the file name from a directory.

Upon selection of the "Capture" function 108, a capture and render software application can automatically open. The capture and render software application can then automatically capture the three-dimensional geometry and graphical aspects of the three-dimensional computer model 102 into a geometric computer model. Furthermore, the capture and render software application can render the geometric computer model into a virtual format, and display the geometric computer model in a viewer interface, as explained in greater detail below.

More specifically, in at least one implementation upon selection of the "Capture" function, the plug-in can send a request to a server (web-based or otherwise) for the capture and render software application. Upon receiving the request, the server can send the capture and render software application to the designer's computer system. For example, the server can send one or more Java application files or other executable instructions. Upon receipt of the application files, the designer's computer system can extract and launch the capture and render software application.

Thus, in at least one implementation, the capture and render software application can be hosted on a web server. In such implementations, at least the first time a designer selects the "Capture" function 108 during a session, the web server can send the capture and render software application to the designer's computer system. Upon receipt of the capture and render software application from the web server, the designer's computer system can launch the capture and render software application. One will appreciate in light of the disclosure herein that hosting the capture and render software application on a web server can ensure that the designer has the latest version of the capture and render software application each time the designer seeks to capture a three-dimensional computer model 102.

In an alternative implementation, the capture and render software application can be stored directly on the designer's computer system. In such implementations, the designer's computer system can launch the capture and render software application directly without requiring files from the web server. In yet further implementations, the capture and render software application and/or plug-in can require connection with, and instruction from, the web server in order to launch the capture and render software application, irrespective of whether the capture and render software application is stored locally on the designer's computer system or on the web server.

In any event, once the designer selects the "Capture" feature 108, the designer's computer system can launch the capture and render software application, if the designer has not already opened the capture and render software application. Once the capture and render software application has launched, the capture and render software application can capture the geometry and graphical aspects of the three-dimensional computer model 102. For example, in one implementation the capture and render software application automatically sends an export command to the design software application. The design software application then exports the file(s) comprising the three-dimensional computer model 102. The capture and render software application then imports the file(s) comprising the three-dimensional computer model 102. During, or after, the importation of the file(s) comprising the three-dimensional computer model 102, the capture and render software application can parse the file(s) and save only the data necessary to recreate the geometry and graphical aspects of the three-dimensional computer model 102. In alternative implementations, the capture and render software application can run through the database of the design software and extract and save only the data necessary to recreate the geometry and graphical aspects of the three-dimensional computer model 102. Additionally, the capture and render software application can save or extract a context tag that indicates what type of component each piece of geometry comprises.

In one or more implementations the capture and render software application can extract and/or save the only the relevant geometry and relevant graphical aspects of the three-dimensional computer model 102 (in contrast to all of the geometry and graphical aspects). Specifically, the capture and render software application can extract and/or save the only the data or files associated with the viewable surface (for example, outer surfaces) of the three-dimensional computer model 102. Thus, the capture and render software application can recognize components and/or surfaces of the three-dimensional computer model that are not viewable and exclude data associated with such components and/or surfaces from the extracted data or not save such data.

For example, the files that form a wall 110 of the three-dimensional computer model 102 can include data corresponding to the interior components of the wall 110 (i.e., beams, framing, insulation, electrical and plumbing components), part manufacturer data, part cost data, dimensional data, etc. In one or more implementations, the capture and render software application can recognize and understand the attributes of the wall and all of the components associated with the wall. The capture and render software application can parse the data pertaining to the wall 110 and save only the relevant geometry and graphical aspects (in this case outer wall geometry, the finish texture and color data). Thus, in one or more implementations, the capture and render software application will recognize the interior components of the wall as unnecessary or irrelevant with respect to reproducing the outer or viewable geometry (i.e., the outer surfaces of the wall 110) and will not save the geometry data and graphical aspect data associated with such interior components.

In one example implementation, the capture and render software application can run on default parameters. More specifically, the capture and render software application can automatically capture geometry and graphical aspects of the three-dimensional computer model 102 upon a single selection of the "Capture" function 108. Alternatively, upon selection of the "Capture" function 108, the capture and render software application can open a parameter menu box. The parameter menu box can include several selections and options that dictate what features of the three-dimensional computer model 102 will be captured. Additionally, the parameter menu box can include several additional selections and options that dictate how the captured geometry and graphical aspects of the three-dimensional computer model 102 will be rendered. For example, the capture and render software application can allow for the capture of any number of graphical attributes, including, but not limited to, colors, shading, images (such as jpegs or bitmaps), finishes, object transparency, and the like.

The capture and render software application can save the geometry, graphical aspects, and context tags as a geometric computer model file. The geometric computer model file can comprise a file type that is compatible with the capture and render software application, but not with the design software. In at least one implementation, the capture and render software application saves or stores the geometric computer model file only in the memory (i.e., volatile storage) of the designer's computer system. In such implementations, the capture and render software application does not cache or store the geometric computer model file in the non-volatile memory of the designer's computer system. In alternative implementations, the capture and render software application can store the geometric computer model file in the non-volatile memory of the designer's computer system.

Figure 2:
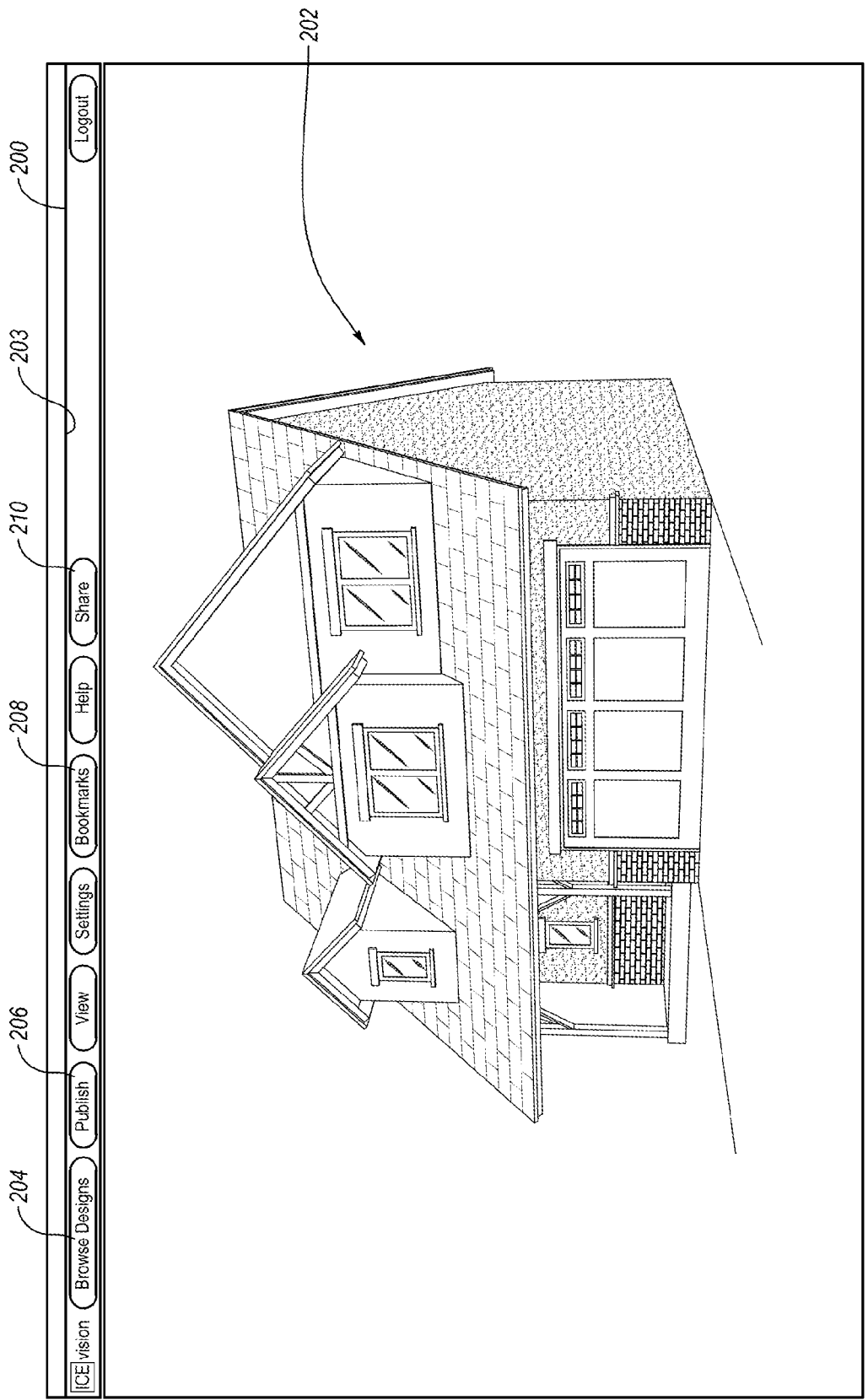
FIG. 2 illustrates a schematic diagram of an interface within which a geometric computer model, which includes the geometry and graphical aspects of the computer model of FIG. 1, is displayed in accordance with an implementation of the present invention.

Once the geometric computer model file corresponding to the three-dimensional computer model 102 is captured, the capture and render software application can render the geometry and graphical aspects of the geometric computer model accordingly. In particular, capture and render software application can render and display the three-dimensional geometry in a viewer interface. For example, FIG. 2 illustrates a viewer interface 200 of the capturing and rendering software application. The viewer interface 200 displays a rendered geometric computer model 202 that includes the geometry and graphical aspects of the three-dimensional computer model 102. As explained in greater detail below, the viewer interface 200 can include a tool bar 203 that provides the designer with various functions or features, including "Browse Designs" 204, "Publish" 206, "Bookmarks" 208, and "Share" 210.

The capture and render software application can recognize the length, width, and height of objects in the three-dimensional computer model 102. Moreover, the capture and render software application can recognize graphical attributes, in addition to the dimensions, such as color, shading, finishes, transparency, images, and the like. Furthermore, capture and render software application can render the geometry and graphical aspects of the geometric computer model in a detailed and realistic-appearing view. Also, the user can navigate different visual effects of different angles for the design elements throughout the three-dimensional view without needing to wait for additional processing. Thus, the capture and render software application can provide a much richer viewing experience to the user regarding how various geometry of the geometric computer model will look in a real-world environment, in much quicker time.

In particular, because the geometric computer model file is much smaller than the design software files corresponding to the three-dimensional computer model 102, the capture and render software application can render and allow for much quicker navigation than that possible with the design software. Furthermore, because the capture and render software application processes and only renders the geometry and graphical aspects of the three-dimensional computer model 102, the computing resources used to render and navigate the geometric computer model are minimal. One will appreciate in light of the disclosure herein that in the implementations in which only the relevant geometry and relevant graphical aspects are saved, the capture and render software application can further optimize the size of the geometric computer model file and the ease of displaying the geometry.

Figure 3:
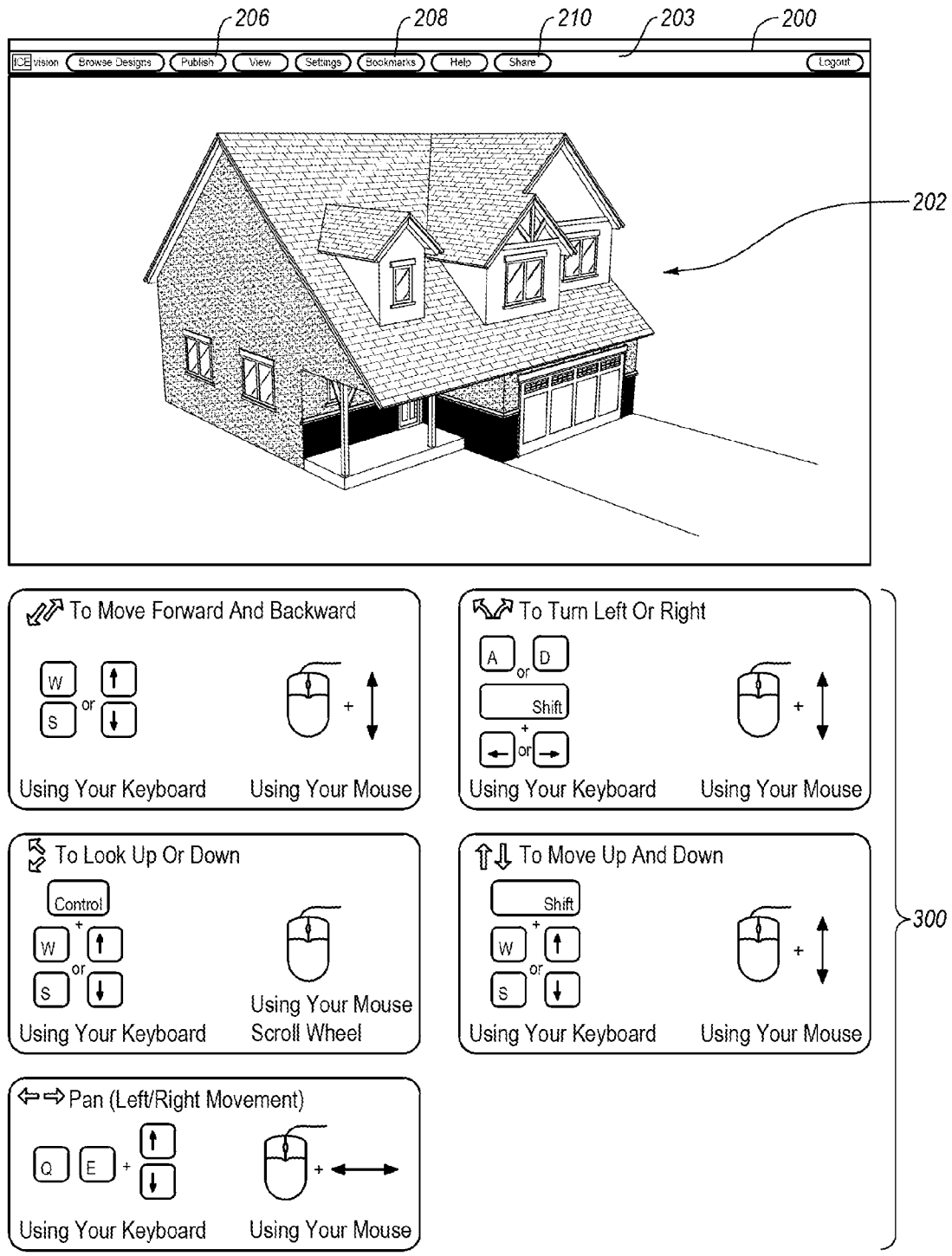
FIG. 3 illustrates a schematic diagram of the interface of FIG. 2 and illustrates exemplary controls for navigating the geometric computer model within the interface in accordance with an implementation of the present invention.

For example, FIG. 3 illustrates a view of the viewer interface 200 and rendered geometric computer model 202, in which the viewer has changed the viewing position of the geometric computer model 202. FIG. 3 further illustrates some exemplary controls 300 for navigating the geometric computer model 202. In particular, the viewer interface 200 is capable of providing the designer or viewer with the ability to explore the geometric computer model 202 in an intuitive natural manner. For example, the viewer interface can include an intuitive video-game like navigational configuration that changes the viewer's viewpoint, rather than moving the three-dimensional design in design space. The result is an increased ability to efficiently and effectively display all aspects of the three-dimensional model.

As mentioned, the navigational configuration of the viewer interface 200 can be video-game like, such that the designer controls the view point of the viewer using a computer mouse and/or keyboard. For example, in one or more implementations the designer can virtually "navigate" around (or through) the geometric computer model 202 by clicking the left mouse button while moving the mouse in any direction. In addition, in one or more implementations the designer can maintain a position with respect to the building, and then look (i.e., as if the user is moving his head on his neck in the virtual environment) in any direction by clicking the right mouse button while moving the mouse in any direction. Furthermore, in one or more implementations the transparency of windows can allow the viewer to look through the window at a representation of what the interior of the house would look like from the perspective from outside the window. Additionally, in one or more implementations the viewer can pass through door, windows, and/or walls to allow navigation of the interior of a structure, as if the designer where actually in the structure. In yet further implementations, the designer can customize the navigational controls (i.e., assign functions to buttons) to allow for intuitive navigation according to the designer's individual preferences.

As illustrated in both FIGS. 2 and 3, the rendered three-dimensional geometric computer model 202 appears in virtual environment akin to a video-game like environment. In other words, the capture and render software application can incorporate not only the three-dimension geometry of the three-dimensional computer model 102 of FIG. 1, but also incorporates graphical attributes such as the outside building color, the window transparency, and interior features such as color and shading that were specified in the design software, but were not displayed due to using excessive computer resources.

In one implementation, the capture and render software application can use context-based ambient occlusion as a method for providing shading and lighting effects on the geometric computer model 202 to provide a realistic viewing experience. In particular, the capture and render software application can use the context tags captured from the three-dimensional computer model 102 to provide more realistic rendering and displaying of the geometric computer model 202. More specifically, the capture and render software application can use the context of a three-dimensional shape to determine how to shade the shape or adjacent shapes.

For example, the capture and render software application can calculate a lighting value (value that indicates how bright or dark to make a vertex or surface) for one or more of the vertices of the geometric computer model 202 and tie the lighting value to the vertices. In determining the lighting value, the capture and render software application can determine if other features or geometry will cause the particular vertices to fall within a shadow, and provide the vertex with an appropriate lighting value. Furthermore, the capture and render software application can analyze the context of other features or geometry and determine based on their context whether to change the lighting value of a particular vertex.

For instance, in determining the lighting value of a wall section adjacent a door, the capture and render software application can determine what geometry is adjacent the wall section. Thus, the capture and render software application can recognize the geometry of a door trim adjacent, or in front of, the wall section. Once adjacent geometry has been recognized, the capture and render software application can determine the context of the adjacent geometry (i.e., what the geometry comprises (in this case door trim)). Based at least in part on the context of the adjacent geometry, the capture and render software application provide the wall section with a lighting value. For example, the capture and render software application can ignore the effect of the door trim or a transparent table or window to reduce shading errors.

Once the geometry, graphical aspects, and lighting values have been determined, the capture and render software application can send this predetermined data to a graphical processing unit ("GPU") of a computerized system, along with any other relevant information. In general, GPU and related hardware is often more able to handle the demands that may be needed for some cases of accurate graphical rendering. The GPU then processes the data separately from other processing components in the computer system, and sends the processed data (e.g., pixel information) to a display device. Since much of the detailed rendering of the visual effects has been done previously, the GPU can produce a fairly accurate data stream from the template without requiring a significant amount of additional processing resources and processing time.

Additionally, the GPU, in conjunction with the capture and render software application, can allow a user to navigate the geometric computer model 202 (i.e., under objects, around corners, through ceilings, etc.), while still effectively providing the expected visual effects. For example, the user can use the navigational controls, which changes X/Y/Z viewing information for the design space. This input can cause the capture and render software application to provide additional data to the GPU or processing, or can simply tell the GPU to pull other previously-processed data from cache. Thus, the capture and render software application can provide real-time lighting effects to the geometric computer model 202 as it is navigated within the viewer interface 200.

Figure 4:
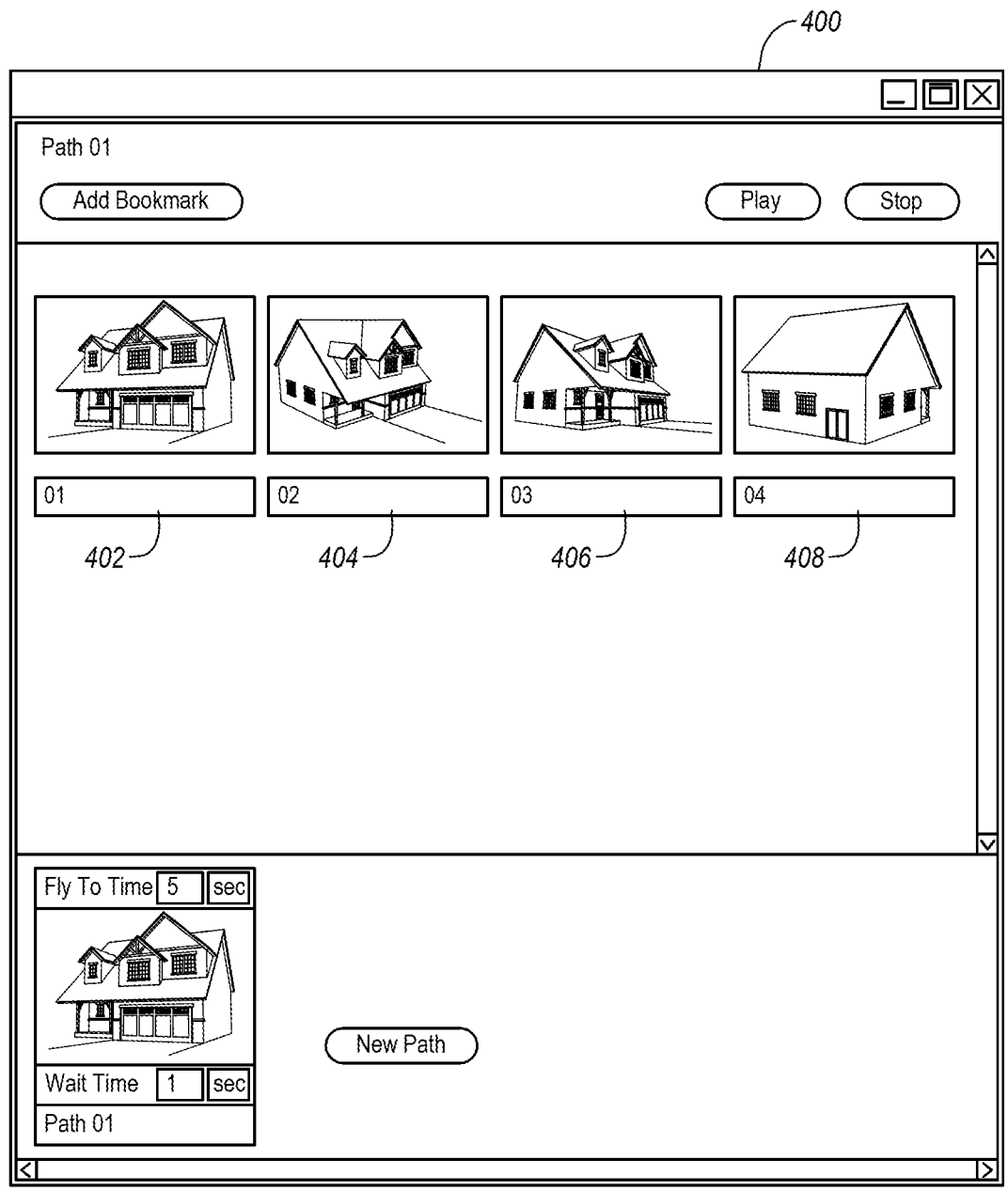
FIG. 4 illustrates a schematic diagram of an interface for creating a guided tour of a geometric computer model in accordance with an implementation of the present invention.

In addition to the example views illustrated in FIGS. 2 and 3, the capture and render software application can generate almost any number of views as the designer virtually navigates around and in the geometric computer model 202. Moreover, the designer can create a virtual tour using a bookmarks feature included in at least one implementation of the present invention. For example, the designer can select the "Bookmarks" feature 208 from the tool bar 203 of the viewer interface 200. Upon selection of the "Bookmarks" feature 208, the capture and render software application can open a bookmarks window 400, as shown in FIG. 4.

The bookmarks window 400 can provide the designer with the ability to save a series of views in a particular order and then replay those views in virtual tour format. For example, the designer can locate a desired view and then click on the "Bookmarks" feature 208. The bookmarks window 400 can then allow the designer to save the particular desired view as a bookmark. After saving one or more desired views 402, 404, 406, 408, the designer can then create a virtual tour of the geometric computer model 202. The capture and render software application can also allow the designer to re-order or delete views to modify the tour. Furthermore, the capture and render software application can allow the designer to add notations to each of the views, as well as select the order in which the views will appear during the virtual tour. Additionally, in one or more implementations, the designer can control the lapse time between any one bookmarked view and another, and how long the tour will pause at any given bookmarked view.

As previously mentioned, the capture and render software application can save the file(s) or data corresponding to the geometric computer model 202 in the memory of the designer's computer system. These files or data can also include the bookmarks and virtual tour files. The capture and render software application can provide the designer with an option of publishing the geometric computer model 202. Specifically, the designer can select the "Publish" 206 feature provided by the viewer interface 200. Upon selection of the "Publish" 206 feature, the capture and render software application can open a publish window 500, as shown by FIG. 5.

Figure 5:
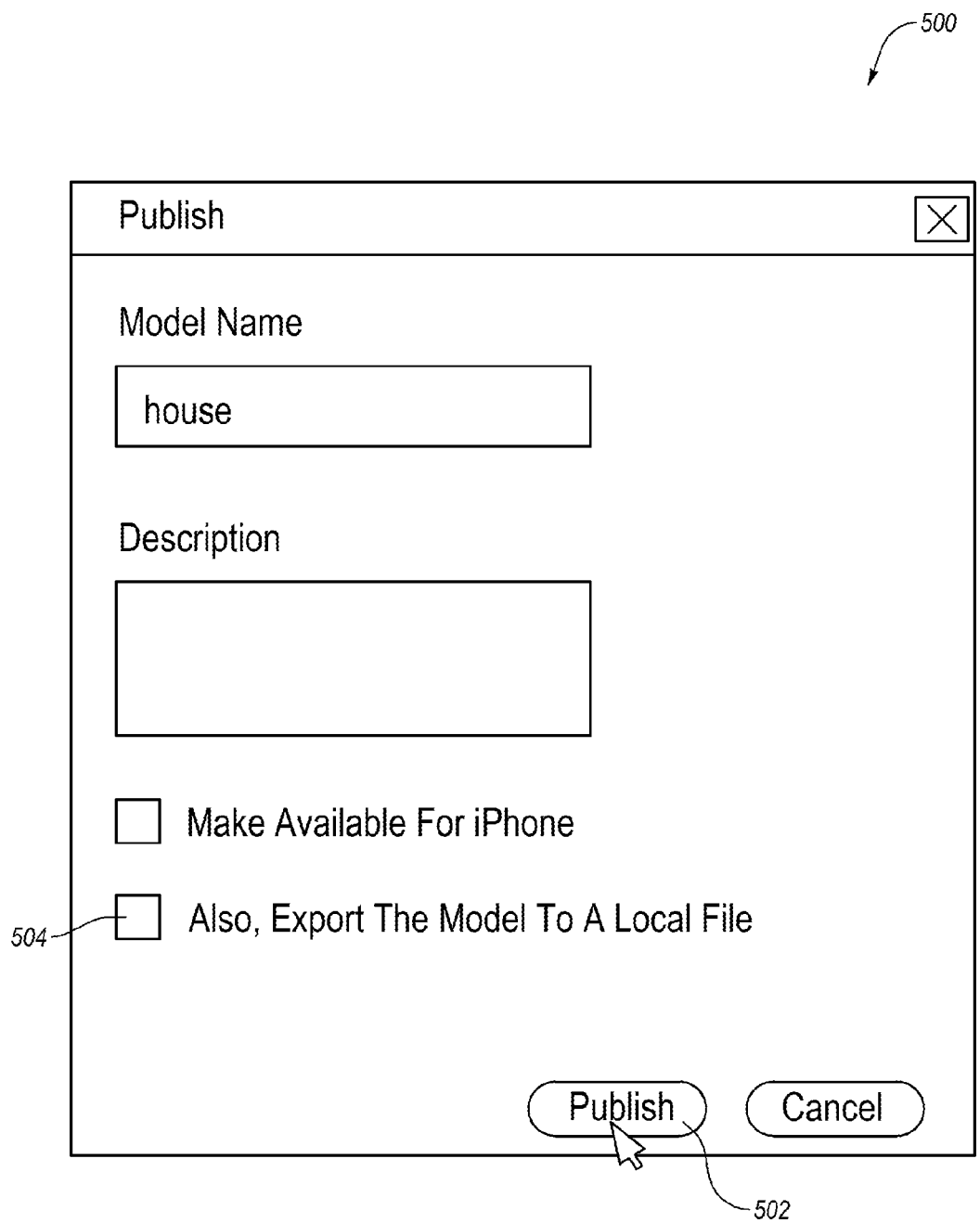
FIG. 5 illustrates a schematic diagram of an interface for publishing a graphic computer model in accordance with an implementation of the present invention.

As shown by FIG. 5, the publish window 500 can allow the designer to optionally name the geometric computer model 202, and provide a description of the geometric computer model 202. The publish window 500 can also provide the option to publish the geometric computer model 202. In particular, upon selecting the publish icon 502, the capture and render software application can save the geometric computer model 202, and any associated bookmarks and virtual tour data to a server. In one or more implementations, the server can comprise a web server. In particular, the capture and render software application can save the geometric computer model 202 to a specific web address. As explained in greater detail below, once saved to the web server, the capture and render software application can allow the designer to securely share the geometric computer model 202.

The capture and render software application can allow the designer to publish the geometric computer model 202 in a format that allows for viewing on mobile devices, such as the IPHONE, as shown by FIG. 5. Additionally, the capture and render software application can allow the designer to also optionally save the geometric computer model 202 to a local or network specific location (non-volatile storage) by selecting a local save option 504. One will appreciate in light of the disclosure herein, that in at least one implementation, the geometric computer model 202 will not be saved to a local file (non-volatile storage) unless the local save option 504 is selected. Specifically, in such implementations, the capture and render software application will save the geometric computer model 202 to the designer's memory (i.e., volatile storage), unless the publish option is selected. Thus, in at least one implementation, once the designer closes the capture and render software application, the geometric computer model 202 will be automatically deleted from the designer's computer system.

When the local save option 504 is used, the capture and render software application can provide the designer the ability to use the captured geometry and graphical aspects of a three-dimensional computer model in other design software applications, without sharing the native design file. For example, a designer can design a piece of furniture or other model in a first design software application, capture and render the design of the furniture using capture and render software application. After saving the geometric computer model to a local file, the designer can then import the geometric computer model into another design using a second design software application. This allows the designer to share the general concept of the design, no matter the other designers' choice of design software, and without the designer sharing any work product or other proprietary information. In at least one implementation, the imported geometric computer model is in a read-only format.

Implementations of the present invention can also provide a shared web-based database that provides any designer the ability to browse all geometric computer models that the designer has saved or published to the web server. Additionally, the shared web-based database can allow a designer to view any geometric computer models made publicly available or shared with the designer by others. For example, the designer or user can select the "Browse Designs" option 204 in provided by the viewer interface 200. Upon selection of the Browse Designs" option 204, the capture and render software application can send a request to the web server, which can provide a list of available geometric computer models.

Figure 6:
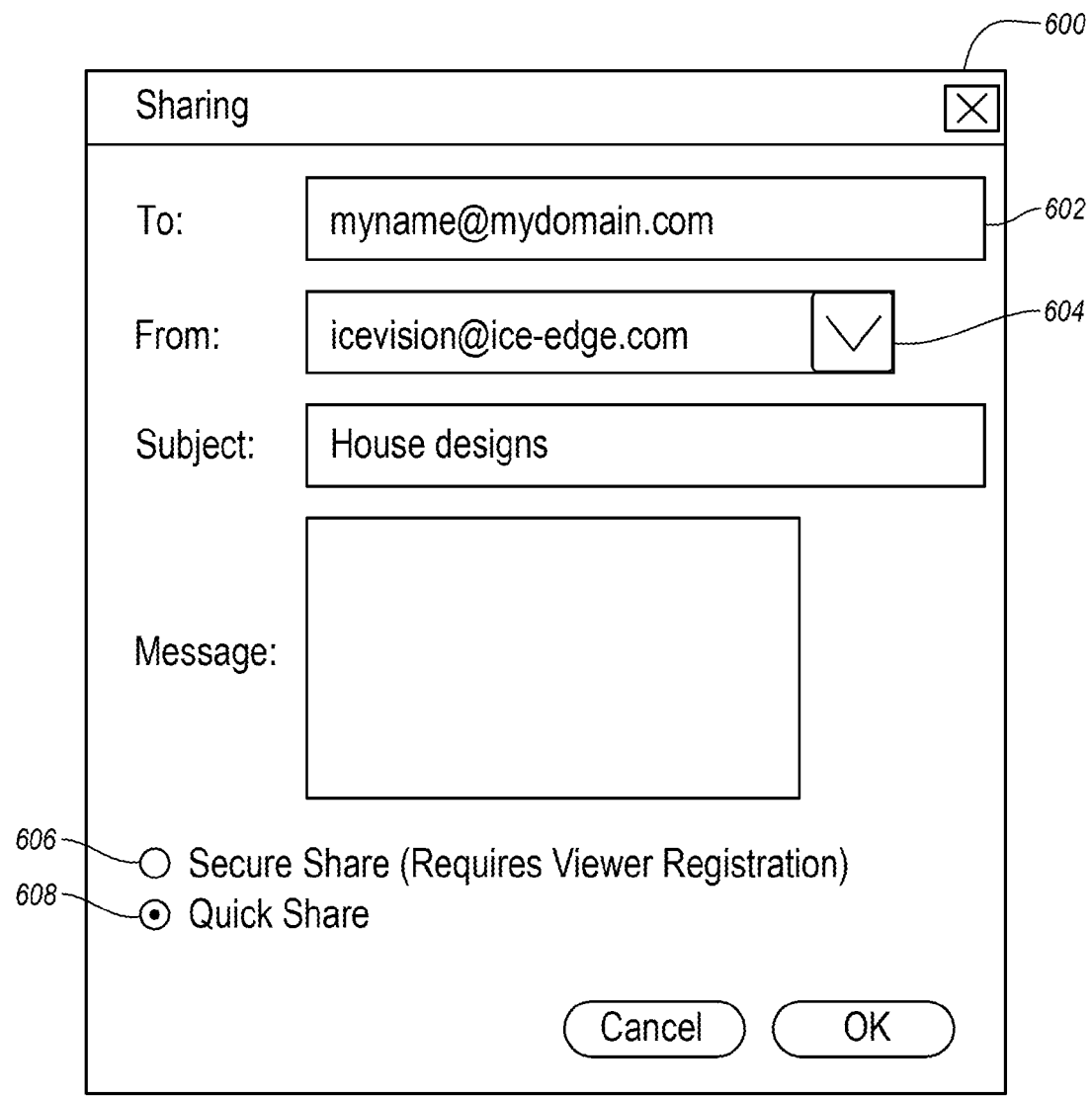
FIG. 6 illustrates a schematic diagram of an interface for sharing a graphic computer model in accordance with an implementation of the present invention.

In any event, after publishing the geometric computer model 202, the capture and render software application can allow a designer to share the geometric computer model 202 with others. In particular, the designer can select the "Share" feature 210 feature provided by the viewer interface 200. Upon selection of the "Share" feature 210, the capture and render software application can open a sharing window 600, as shown by FIG. 6.

The sharing window 600 can allow the designer to share a published geometric computer model 202. In particular, after selecting the specific geometric computer model 202, the designer can then enter one or more email addresses in an email field 602, with the option of including a subject line and message, as well as sender information 604. The capture and render software application can then send an email to each email address listed that provides a link to the published geometric computer model 202.

In one or more implementations, the designer can choose whether or not to provide the viewer with the capability to share the geometric computer model 202 with other users. To facilitate this choice, the sharing window 600 can allow the designer to choose between a "Quick Share" 608 or a "Secure Share" 606. When the designer selects the "Quick Share" option 608, the capture and render software application will forward a link that the viewer can in turn forward, and which allows any user or computer system with the link to gain access to the geometric computer model 202 through the web server. Alternatively, if the designer selects the "Secure Share" option 606, the email sent to the viewer is formatted such that only the viewer whose email address the designer entered can use the hyperlink in the email to view geometric computer model 202.

In any event, when the viewer receives the email and clicks on the link, the viewer can be directed to the appropriate website, which can confirm that the viewer agrees with the terms of the use agreement. Upon agreeing, the appropriate website can send a launching file to the viewer's computer system. In one or more implementations, the launching file can comprise a JAVA network launching protocol file. Upon opening the launching file, the viewer's computer system can send a request to the web server for a capture and render software temporary viewer application, which is hosted on the web server.

Upon receiving the request, the web server can send the capture and render software temporary viewer application to the viewer's computer system. For example, the web server can send one or more Java application files or other executable instructions. Upon receipt of the application files, the viewer's computer system can extract and launch the capture and render software temporary viewer application.

In at least one implementation of the present invention, the web server can also send executable instructions to the viewer's computer system, which when executed by a processor, cause the capture and render software temporary viewer application to be stored within the memory (i.e., volatile storage) of the viewer's computer system. The viewer's computer system can then launch the capture and render software temporary viewer application. Once launched, or during the launching, the capture and render software temporary viewer application can send a request to the web server for the geometric computer model 202. The web server can send the geometric computer model 202 to the client's computer system where is it is stored in the memory (i.e., volatile storage) of the viewer's computer system.

In alternative implementations, the capture and render software temporary viewer application and/or the geometric computer model 202 can be stored within the non-volatile storage of the viewer's computer system. One will appreciate in light of the disclosure herein; however, that in at least one implementation the capture and render software temporary viewer application and the geometric computer model file 202 will only be stored in the memory (i.e., volatile storage) of the viewer's computer system. In such implementations, the capture and render software temporary viewer application and the geometric computer model file 202 will automatically be removed the viewer's computer upon the closing of the capture and render software temporary viewer application.

In at least one implementation, the published and subsequently viewable geometric computer model 202 does not allow the viewer to have access to the original design file(s) used to create the three-dimensional computer model 102. Moreover, the geometric computer model 202 does not contain any dimensional or other work product information about the three-dimensional computer model 102. Therefore, the designer can confidently share the geometric computer model 202 with other users knowing that the other users will not have access to work product or other proprietary information related to the original three-dimensional computer model 102.

Moreover, implementations of the present invention allow the user to share the geometric computer model 202 with a viewer, no matter if the viewer has the same version, or any version, of design software used to create the original three-dimensional computer model 102. Indeed, one or more implementations do not require that the viewer have any type of design software or computer model viewer software prior to receiving the link from the web server. Specifically, when the viewer clicks on the provided link, the capture and render software temporary viewer application is automatically downloaded, thus allowing the viewer to view and explore the geometric computer model 202 as described above.

Figure 7:
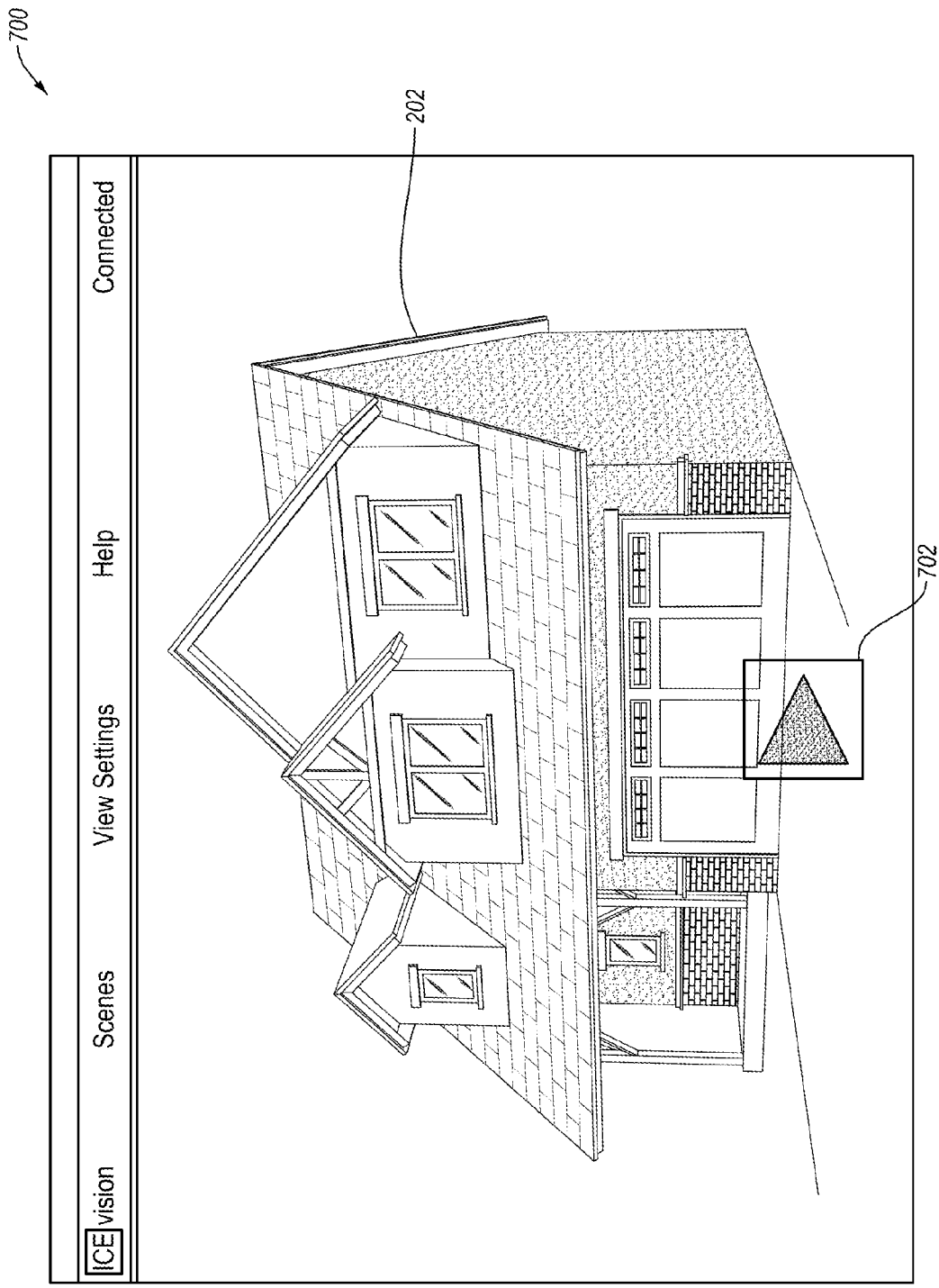
FIG. 7 illustrates a schematic diagram of a viewer interface within which the geometric computer model of FIG. 2 is displayed in accordance with an implementation of the present invention.

For example, FIG. 7 depicts a capture and render software temporary viewer application 700 displaying the geometric computer model 202. One will appreciate that capture and render software viewer 700 can render and display the geometric computer model 202 using the same methods and techniques described above in relation to the viewer interface 200. At this point the viewer is free to navigate through geometric computer model 202 using the intuitive navigational controls described herein above.

The capture and render software viewer 700 can further allow the viewer to view any bookmarked tours, and generally view the all aspects of the three-dimensional model. For example, the capture and render software viewer 700 can include a play-button 702 or similar graphic device can be displayed in the viewer interface 200. A viewer can select the play-button 702, at which point the capture and render software viewer 700 can automatically move from one bookmarked view to the next in a format that allows the viewer to continue to see the three-dimensional geometric computer model 202 while "moving" from one view to the next. During the virtual tour, as each bookmarked view is reached, the capture and render software viewer 700 can display the notations (if any) associated with each view. Additionally, the capture and render software viewer 700 can provide the viewer with the ability to pause, stop, rewind, or fast forward the bookmarked tour.

Figure 8:
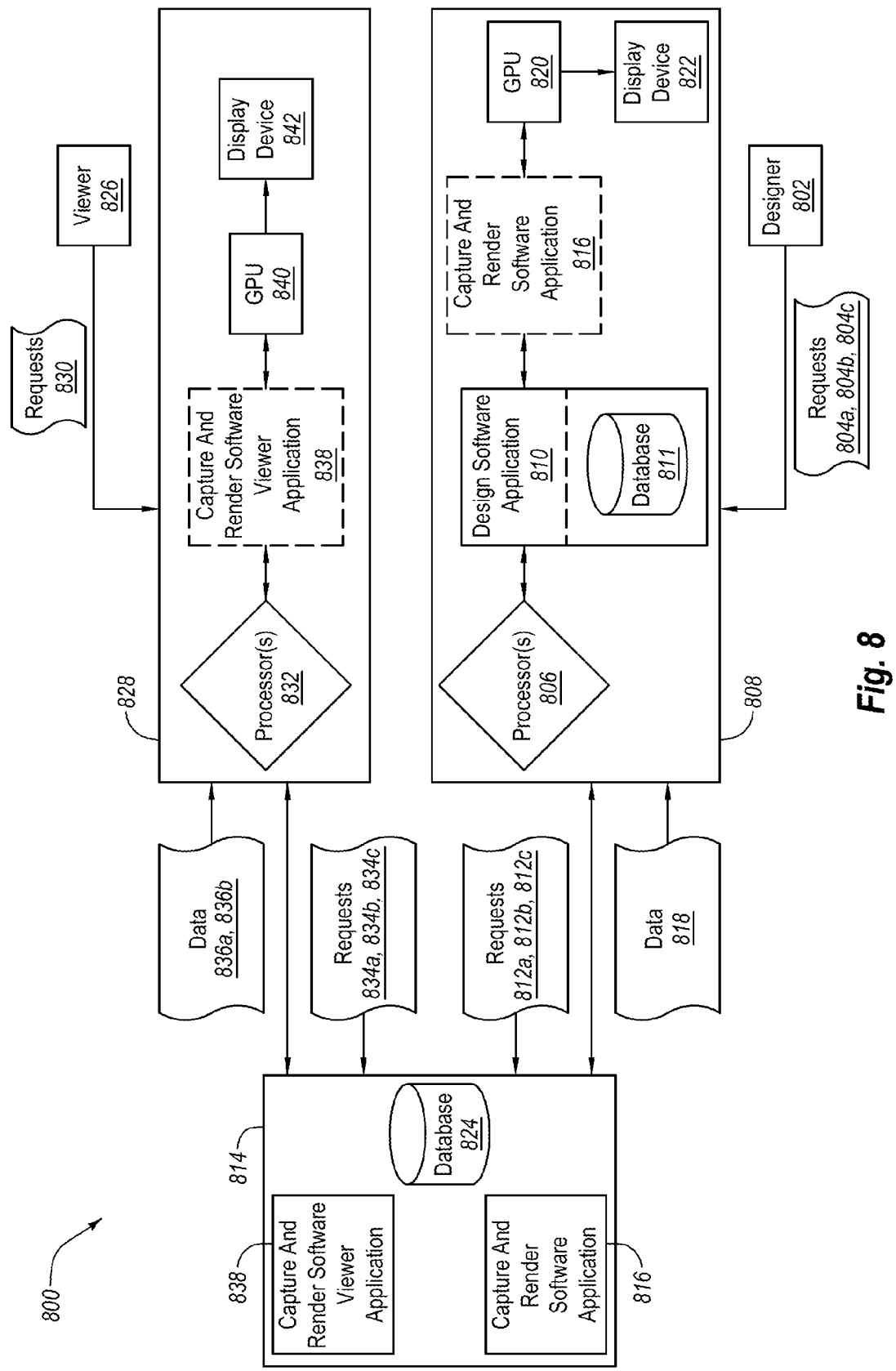
FIG. 8 illustrates an architectural schematic diagram of a system for capturing and sharing a geometric computer model in accordance with an implementation of the present invention.

FIG. 8 illustrates an architectural schematic diagram of a system 800 for capturing and rendering the geometry and graphical aspects of a three-dimensional computer model. In particular, FIG. 8 shows that designer 802 sends one or more user requests 804a, 804b, 804c to one or more processors 806 of a designer computer system 808. "Requests" can comprise any client-side instructions, or even server-side, that, when executed, cause the one or more processors 806 to process computerized instructions associated with requests. The designer 802 (or viewer 826) can send the request using one or more input devices (i.e., microphone, joy stick, game pad, satellite dish, scanner, or the like).

Thus, the designer can make a request 804a to capture the geometry and graphical aspects of a three-dimensional computer model 102 created by a design software application 810. Upon receiving the one or more requests 804a, the one or more processors 806 can send one or more requests 812a to a web server 814 for a capture and render software application 816 hosted on the web server 814. In response to the one or more requests 812a, the web server 814 can send one or one or more messages 818 (i.e., data) comprising the capture and render software application 816. For example, the one or more messages 818 can include executable instructions that cause the designer computer system 808 to receive and launch the capture and render software application 816. In at least one implementation, the capture and render software application 816 is stored within non-volatile memory of the designer computer system 808.

Once launched, the capture and render software application 816 can cause the one or more processors 806 to automatically send a request to the design software application 810 to export the file(s) corresponding to the three-dimensional computer model 102. The design software application 810 can then cause one or more processors 806 to export the file(s) corresponding to the three-dimensional computer model 102. At this point, the capture and render software application 816 can cause the one or more processors 806 to import and parse the file(s) corresponding to the three-dimensional computer model 102 such that only the geometry, graphical aspects, and one or more context tags are saved by the capture and render software application 816. Alternatively, once launched, the capture and render software application 816 can cause the one or more processors 806 to run through a database 811 associated with the design software 810 and extract and save only the data necessary to recreate the geometry and graphical aspects of the three-dimensional computer model 102. In any event, the capture and render software application 816 can cause the one or more processors 806 to save the geometry, graphical aspects, and context tags as a geometric computer model file in the volatile storage of the designer's computer system 808.

The capture and render software application 816 can cause the one or more processors 806 to render the geometry and graphical aspects of the geometric computer model 202 accordingly. In particular, the capture and render software application 816 can cause the one or more processors 806 to determine the geometry, graphical aspects, and lighting values as explained above. The capture and render software application 816 (or the one or more processors 806) can send this predetermined data to a GPU 820. The GPU 820 then processes the data separately from other processing components in the computer system 808, and sends the processed data (e.g., pixel information) to a display device 822.

The designer 802 can also send one or more requests 804b to publish the geometric computer model 202. Upon receipt of the one or more requests 804b, the capture and render software application 816 can cause the one or more processors 806 to send the file(s)/data associated with the geometric computer model 202 to the web server 814. Upon receipt of such files/data, the web server 814 can store the file(s) in one or more data bases 824.

The designer 802 can also send one or more requests 804c to share the geometric computer model 202. Upon receipt of the one or more requests 804b, the capture and render software application 816 can cause the one or more processors 806 to send one or more requests 812c to the web server 814 to share the geometric computer model 202 with a particular email address belonging to a viewer 826. The web server 814 can then prepare an email with one or more links to the web server 814. The web server 814 can then send the email to a server (not shown) associated with the email address.

The viewer 826 can use a viewer computer system 828 to open the email sent by the web server 814. Then the viewer 826 can the send one or more requests 830 to one or more processors 832 of the viewer computer system 828 (also referred to as "second remote client computer system") to open the link. The one or more processors 832 can in turn send one or more requests 834a to the web server 814 to open the link. The web server 814 can then send data or one or more message 836a to the one or more processors 832, such as for example, a launching file. Upon opening the launching file, the one or more processors 832 can send a request 834b to the web server 814 for a capture and render software temporary viewer application 838, which is hosted on the web server 814.

In response, to the one or more requests 834b, the web server 814 can send data or one or more message 836b comprising the capture and render viewer software application 816. For example, the one or more messages 836b can include executable instructions that cause the viewer computer system 826 to receive and launch the capture and render viewer software application 838. In at least one implementation, the capture and render software temporary viewer application 838 is stored within non-volatile memory of the viewer computer system 826.

Once launched, or during the launching, the capture and render software temporary viewer application 838 can send a request 834c to the web server 814 for the geometric computer model 202. The web server 814 can send the geometric computer model 202 to the viewer computer system 828 where is it is stored in the memory (i.e., volatile storage) of the viewer computer system 828.

The capture and render software temporary viewer application 838 can cause the one or more processors 832 to render the geometry and graphical aspects of the geometric computer model 202. In particular, the capture and render software temporary viewer application 838 can cause the one or more processors 832 to determine the geometry, graphical aspects, and lighting values as explained above. The capture and render software temporary viewer application 838 (or the one or more processors 832) can send this predetermined data to a GPU 840. The GPU 840 can then process the data separately from other processing components in the viewer computer system 828, and send the processed data (e.g., pixel information) to a display device 842.

Figure 9:
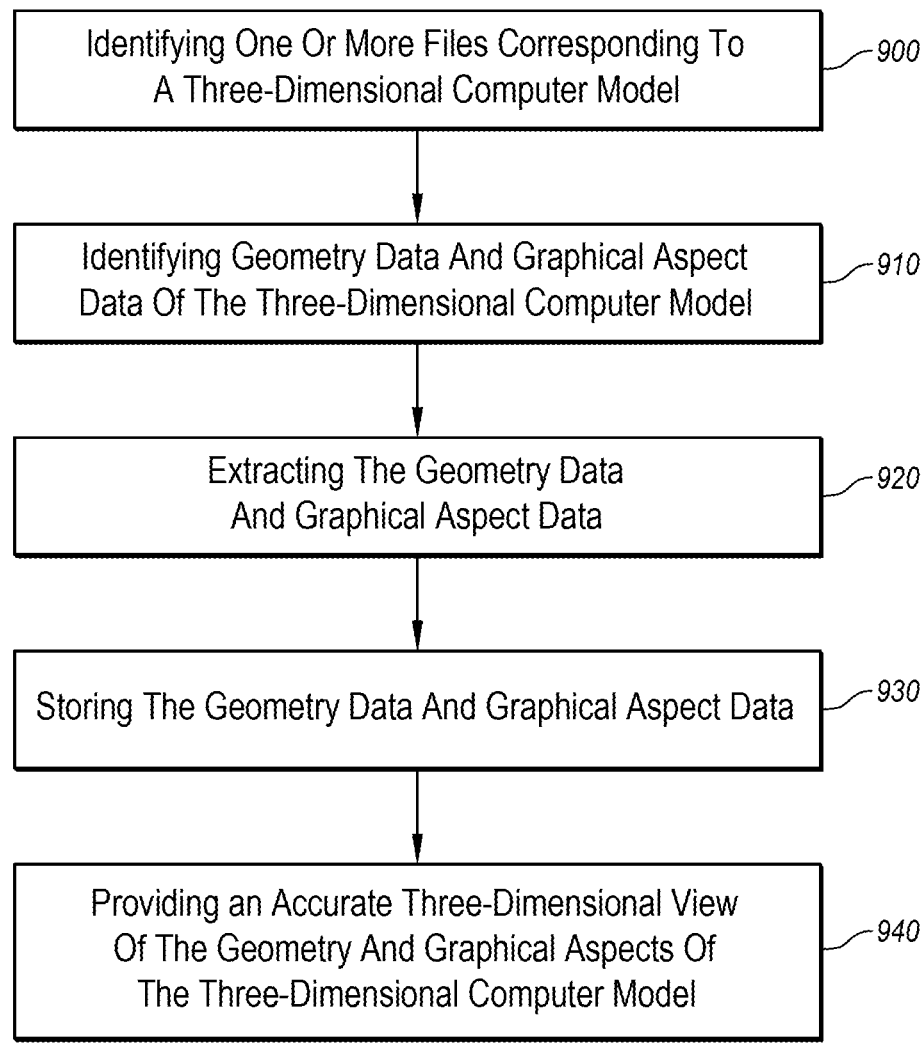
FIG. 9 illustrates a flowchart of a series of acts in a method in accordance with an implementation of the present invention of capturing the geometry and graphical aspects of a computer model.
Figure 10:
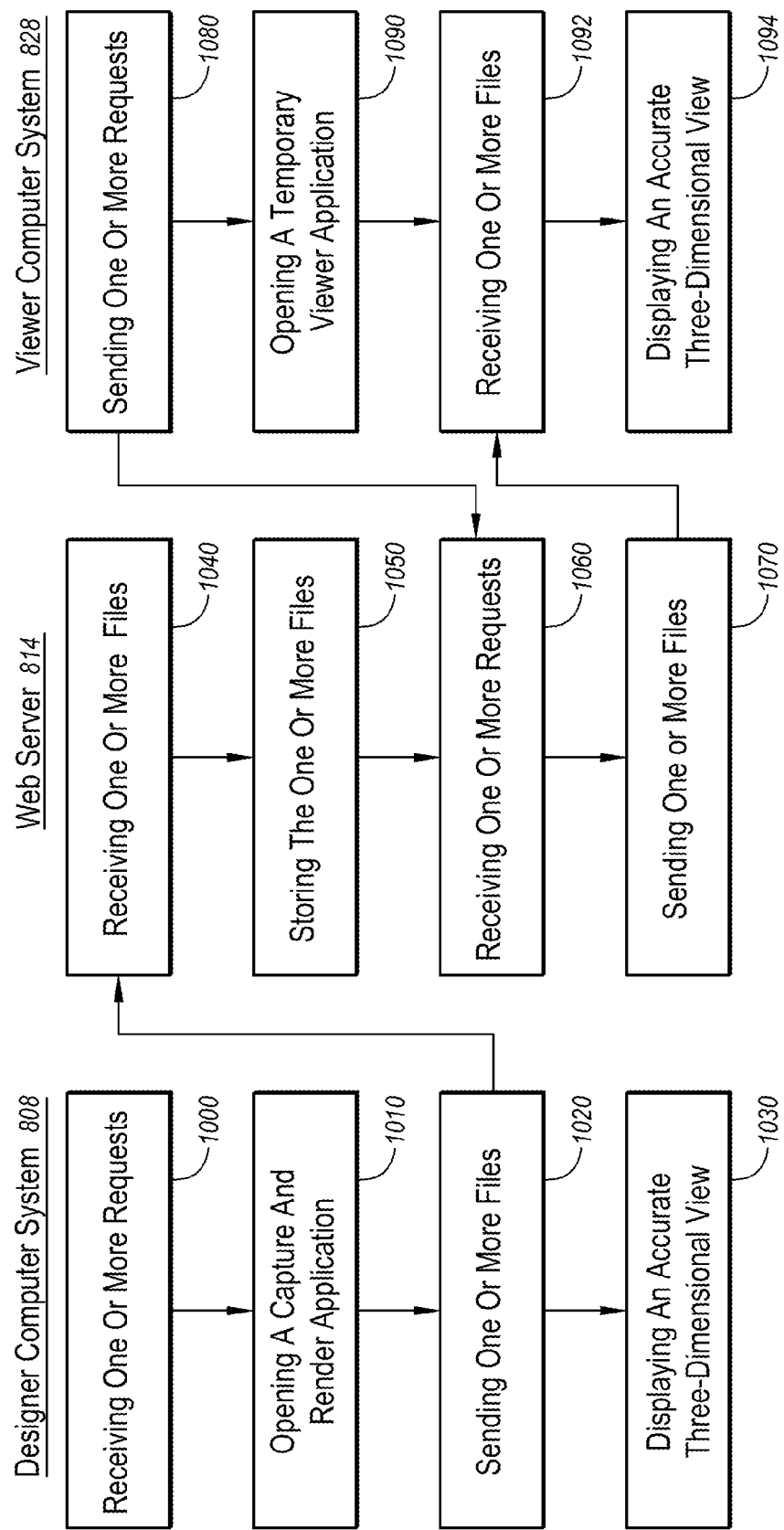
FIG. 10 illustrates a flowchart of methods from the perspective of client computer systems and of a web server in accordance with an implementation of the present invention for capturing and securely sharing the geometry and graphical aspects of a computer model.

Accordingly, FIGS. 1-8 provide a number of schematics and mechanisms for capture, rendering, navigating, sharing, and viewing geometry and graphical aspects of a computer design model. In addition to the foregoing, implementations of the present invention can also be described in terms of flowcharts comprising one or more acts in a method for accomplishing a particular result. For example, FIG. 9 illustrates a method of capturing the geometry and graphical aspects of a computer model. Similarly, FIG. 10 illustrates a method from the perspective of several client computer systems and of a web server for capturing and securely sharing the geometry and graphical aspects of a computer model. The acts of FIGS. 9 and 10 are discussed more fully below with respect to the components and diagrams of FIGS. 1-8. Of course, as a preliminary matter, one of ordinary skill in the art will recognize that the methods explained in detail herein can be modified. For example, various acts of the method described can be omitted or expanded, and the order of the various acts of the method described can be altered as desired.

For example, FIG. 9 shows that a method in accordance with in implementation of the present invention can comprise an act 900 of identifying one or more files corresponding to a three-dimensional computer model. In at least one implementation, the three-dimensional computer model 102 was created by a design software application 810 and is stored within a database 811 associated with the design software application 810. For example, act 900 can include receiving a request 804a to capture the geometry and graphical aspects of a three-dimensional computer model 102 created by a design software application 810.

FIG. 9 also shows that a method in accordance with an implementation of the present invention can comprise an act 910 of identifying geometry data and graphical aspect data of the three-dimensional computer model. For example, act 910 can include parsing the one or more files corresponding to a three-dimensional computer model 102 for data/files relating to the geometry, graphical aspects, and one or more context tags.

Furthermore, FIG. 9 shows that a method in accordance with an implementation of the present invention can comprise an act 920 extracting the geometry data and graphical aspect data from the one or more files corresponding to the three-dimensional computer model. Act 920 can include sending a request to the design software application 810 to export the one or more files corresponding to a three-dimensional computer model 102. Act 920 can then involve importing and parsing the geometry data and graphical aspect data from the exported files. Alternatively, act 920 can include searching and extracting the geometry data and graphical aspect data from a database 811 associated with the design software 810 for the one or more files corresponding to a three-dimensional computer model 102.

In addition, FIG. 9 shows that a method in accordance with an implementation of the present invention can comprise an act 930 of storing the geometry data and graphical aspect data. For example, act 930 can include storing the geometry data and graphical aspect data of the three-dimensional computer model 102 in a storage module unassociated with the design software application 810. In at least one implementation, act 930 can involve storing the geometry data and graphical aspect data in volatile memory.

As shown by FIG. 9, the method can also comprise an act 940 of providing an accurate three-dimensional view of the geometry and graphical aspects of the three-dimensional computer model. For example, act 940 can also include providing an accurate three-dimensional view of the geometry and graphical aspects of the three-dimensional computer model 102 at a display device 822 through communication with a graphical processing unit 820. In at least one implementation, act 940 can include identifying one or more geometries that surround one or more vertices associated with the three-dimensional view of the geometry and graphical aspects of the three-dimensional computer model; and providing a lighting value to one or more vertices based on the one or more surrounding geometries. Act 940 can also include determining the lighting value based at least in part upon the one or more context tags. Still further act 940 can include using the lighting value to providing real-time shading of the three-dimensional view as three-dimensional view changes based on navigational input.

Additionally, FIG. 10 shows that a method from the perspective of designer computer system 808 (also referred to herein as "first remote client computer system") for capturing and securely sharing the geometry of a three-dimensional computer model 102 can comprise an act 1000 of receiving one or more requests. For example, act 1000 includes receiving one or more requests through a designer computer system 808 to capture the geometry and graphical aspects of a three-dimensional computer model 102. In particular, act 1000 can include opening a design software application 810 used to create the three-dimensional computer model 102. Act 1000 can also include the designer selecting a "Capture" feature 108 of a plug-in integrated into the design software application 810.

FIG. 10 shows that a method from the perspective of designer computer system 808 can comprise an act 1010 of opening a capture and render software application. For example, act 1010 can include sending a request 812a to a web server 814 for a capture and render software application 816 hosted on the web server 814. Act 1010 can further include receiving one or more application files and/or one or more executable instructions that cause the designer computer system 808 to receive and launch the capture and render software application 816.

Additionally, act 1010 can include sending one or more requests to the design software application 810 to export the file(s) corresponding to the three-dimensional computer model 102. Act 1010 can also include exporting the file(s) corresponding to the three-dimensional computer model 102. Furthermore, act 1010 can include importing and parsing the file(s) corresponding to the three-dimensional computer model 102 for the geometry, graphical aspects, and one or more context tags. Alternatively, act 1010 can include analyzing a database 811 associated with the design software 810 and extracting the geometry, graphical aspects, and one or more context tags of the three-dimensional computer model 102. In any event, act 1010 can further include saving the geometry, graphical aspects, and one or more context tags in volatile storage of the designer computer system.

Additionally, FIG. 10 shows a method from the perspective of designer computer system 808 can comprise an act 1020 of sending one or more geometric computer model files. For example, act 1020 can include sending the file(s)/data associated with the geometric computer model 202 (i.e., the geometry, graphical aspects, and one or more context tags) to the web server 814. Act 1020 can optionally also include deleting the file(s)/data associated with the geometric computer model 202 (i.e., the geometry, graphical aspects, and one or more context tags) from the volatile memory of the designer computer system 808.

In addition to the foregoing, FIG. 10 shows a method from the perspective of designer computer system 808 can comprise an act 1030 of displaying an accurate three-dimensional view. One will appreciate that act 1030 can be performed before or after act 1020. Act 1030 can include displaying an accurate three-dimensional view of the geometry and graphical aspects of the three-dimensional computer model 102 at a display device 822 using the capture and render software application 816. Act 1030 can include using ambient occlusion to give a lighting value to one or more vertices associated with the three-dimensional view of the geometry and graphical aspects of the three-dimensional computer model 102.

Furthermore, a method from the perspective of designer computer system 808 can comprise an act of receiving one or more requests 804b to share the geometric computer model 202. The method can further comprise sending one or more requests 812b to the web server 814 to share the geometric computer model 202. Specifically, the method can include sending one or more email addresses associated with a viewer 826 to the web server 814.

FIG. 10 also shows that a method from the perspective of web server 814 for capturing and securely sharing the geometry of a three-dimensional computer model 102 can comprise an act 1040 of receiving one or more model files. For example, act 1040 can include receiving, from a first remote client computer system (i.e., the designer computer system 808), geometry data and graphical aspect data extracted from a three-dimensional computer model 102 created using a design software application 810.

FIG. 10 shows that a method from the perspective of web server 814 can comprise an act 1050 of storing the one or more files. For example, act 1050 can include storing the geometry data and graphical aspect data in one or more geometric computer model files at a web server 814.

Additionally, FIG. 10 shows that a method from the perspective of web server 814 can comprise an act 1060 of receiving one or more requests. For example, act 1060 can include receiving one or more requests for the one or more geometric computer model files from a second remote client computer system (i.e., viewer computer system 828). Additionally, or alternatively, act 1060 can include receiving one or more requests from a viewer computer system 828 for a capture and render software temporary viewer application 838. Still further act 1060 can include receiving one or more requests from a designer computer system 808 for a capture and render software application 816.

FIG. 10 also shows that a method from the perspective of web server 814 can comprise an act 1070 of sending one or more files. For example, act 1070 can include sending the one or more geometric computer model files and one or more viewer application files from the web server 814 to the second remote client computer system (i.e., viewer computer system 828). The one or more viewer application files can be configured to launch a temporary viewer application 838 on the second remote client computer system (i.e., viewer computer system 828). The temporary viewer application 838 can be configured to display the geometry data and graphical aspect data of the one or more geometric computer model files. In at least one implementation, the geometric computer model files consist essentially of the geometry and the one or more graphical aspects of the three-dimensional computer model 102, and one or more context tags.

Act 1070 can also include sending one or more executable instructions and one or more application files from the web server 814 to a second remote client computer system 828 (i.e., viewer computer system). The one or more executable instructions can cause one or more processors to launch a capture and render software temporary viewer application 838 or a capture and render software application 816 on the second remote client computer system 828. Furthermore, act 1070 can include sending one or more executable instructions configured to cause the second remote client computer system 828 or 808 to store the geometric computer model files and/or the one or more application files in volatile memory.

Still further act 1070 can include sending one or more executable instructions configured to cause the second remote client computer system 828 to delete the one or more geometric computer model files upon the closing of the capture and render software temporary viewer application 838 or the capture and render software application 816. Still further act 1070 can include sending a hyperlink containing the location of the one or more geometric computer model files from the web server 814 to an email address associated with an intended viewer 826.

FIG. 10 additionally shows a method from the perspective of viewer computer system 828 for capturing and securely sharing the geometry of a three-dimensional computer model 102 can comprise an act 1080 of sending one or more requests. For example, act 1080 can include sending one or more requests 834c to a web server 814 for one or more geometric computer model files comprising geometry data and graphical aspect data extracted from a three-dimensional computer model 102 created using a design software application 810.

Additionally, FIG. 10 shows that a method from the perspective of viewer computer system 828 can comprise an act 1090 of opening a temporary viewer application. For example, act 1090 can include opening a temporary viewer application 838 hosted by the web server 814. In at least one implementation, act 1090 can include receiving one or more executable instructions and one or more viewer application files from the web server 814.

FIG. 10 additionally shows that a method from the perspective of viewer computer system 828 can comprise an act 1092 of receiving the one or more files. For example, act 1092 can include receiving the one or more geometric computer model files from the web server 814. Act 1092 can also include storing the one or more geometric computer model files in volatile memory.

In addition to the foregoing, FIG. 10 shows a method from the perspective of viewer computer system 828 can comprise an act 1094 of displaying an accurate three-dimensional view. Act 1094 can include displaying an accurate three-dimensional view of the geometry and graphical aspects of the three-dimensional computer model 102 at a display device 842 using temporary viewer application 838. Act 1094 can include using ambient occlusion to give a lighting value to one or more vertices associated with the three-dimensional view of the geometry and graphical aspects of the three-dimensional computer model 102.

Accordingly, FIGS. 1-10 provide a number of components, schematics, and mechanisms for providing for the capture, rending, displaying, navigating and/or viewing of the geometry of one or more three-dimensional models. Additionally, one or more implementations allow a user to share the geometry and the graphical attributes of a three-dimensional model without sharing the source file or proprietary details of the source file. Furthermore, one or more implementations can allow for sharing of the geometry and graphical attributes of a three-dimensional model without requiring the viewer to have the software used to create the three-dimensional model.

The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. For example, the computer model 102 shown and described was the model of a house. One will appreciate that the present invention is not so limited. Indeed, the present invention can be used to capture and share not only architectural models, but any three-dimensional model. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a computerized environment including a computer system and a design software application, a computer program storage device having computer-executable instructions stored thereon, that, when executed, cause one or more processors in the computer system to perform a method for separately capturing and rendering a design to thereby provide secure, remote three-dimensional viewing access of a design while prohibiting end-user editing thereof, the method comprising:

identifying one or more geometric computer model files corresponding to a three-dimensional computer model created by a design software application and stored within a database associated with the design software application;

receiving one or more user requests through a user interface to capture and distribute the three-dimensional computer model over a network;

identifying minimum geometry data and graphical aspect data of the three-dimensional computer model in the one or more geometric computer model files;

extracting those portions of geometry data and graphical aspect data relevant to outer or otherwise viewable surfaces of the three-dimensional computer model from the one or more files corresponding to the three-dimensional computer model to create one or more separate files that represent less than all of the content of the identified one or more files, wherein extracting the identified geometry data and graphical aspect data comprises:

identifying components and surfaces of the three-dimensional computer model that are not be viewable when rendered in the three-dimensional model including recognizing geometry data associated with at least one interior component, and excluding data associated with the at least one interior component and other identified components and surfaces from the identified geometry data and graphical aspect data, such that data for components and surfaces that would not be viewable when rendered in the three-dimensional model is not stored in the one or more separate files;

storing the created one or more separate files in a read-only format separately from the design software application;

receiving one or more request for the one or more geometric computer model files from a second remote client computer system;

sending the one or more geometric computer model files and one or more temporary viewer application files from the wed server to a second remote client computer system, based on the created read-only one or more separated files of excluded data;

wherein:

the one or more temporary viewer application files are configured to launch a temporary viewer application on the second remote client computer system; and the temporary viewer application is configured to display the geometry data and graphical aspect data of the one or more geometric computer model files, without receiving or incorporating at the web server or the first remote client computer system any changes to the sent one or more geometric computer model files or the three-dimensional computer model from a user of the temporary viewer application; and providing a three-dimensional view of the geometry and graphical aspects of the three-dimensional computer model at the second remote client computer's display device through a capture and render software application unassociated with the design software application, such that the user is able to navigate each provided view at the second remote client computer system location without applying any changes to the provided view or the three-dimensional computer model, and wherein the capture and render software application is configured to delete the created one or more separate files from the second remote client display device upon the closing of the capture and render software application, and such that the software application unassociated with the design software application automatically installs and removes the one or more temporary viewer application within the second remote client computer system.

2. The computer program storage device as recited in claim 1, further comprising providing an accurate three-dimensional view of the geometry and graphical aspects of the three-dimensional computer model at a display device through communication with a graphical processing unit.

3. The computer program storage device as recited in claim 1, further comprising:

identifying one or more geometries that surround one or more vertices associated with the three-dimensional view of the geometry and graphical aspects of the three-dimensional computer model; and providing a lighting value to one or more vertices based on the one or more surrounding geometries.

4. The computer program storage device as recited in claim 3, further comprising storing one or more context tags associated with the three-dimensional computer model in a storage module unassociated with the design software application.

5. The computer program storage device as recited in claim 4, further comprising:

identifying navigational input that changes the three-dimensional view; and providing real-time shading of the three-dimensional view as three-dimensional view changes.

6. The computer program storage device as recited in claim 1, further comprising determining the lighting value based at least in part upon the one or more context tags wherein identifying components and surfaces of the three-dimensional computer model that would not be viewable when rendered in the three-dimensional model includes recognizing those geometric and graphical aspects of the three-dimensional computer model that are unnecessary or irrelevant with respect to reproducing the outer or viewable geometry of the three-dimensional computer model.

7. The computer program storage device as recited in claim 1, further comprising:

analyzing the one or more files corresponding to a three-dimensional computer model stored in the database associated with the design software application;

wherein the identified geometry data excludes component data associated with at least one interior or otherwise non-viewable surface of the three-dimensional computer model.

8. The computer program storage device as recited in claim 1, wherein extracting the geometry data and graphical aspect data comprises extracting only the geometry data and graphical aspect data relevant to outer or otherwise viewable surfaces of the three-dimensional computer model.

9. The computer program storage device as recited in claim 8, further comprising:
- recognizing geometry data associated with at least one interior component; and
- excluding the geometry data associated with the at least one interior component from the extracted geometry data.

10. The computer program storage device as recited in claim 1, further comprising:
- identifying an electronic request through a user interface to share the three-dimensional model using a quick share link, wherein the quick share link comprises a general access URL for the three-dimensional model hosted at a web server; and
- sending the quick share link to a user that made the electronic request, wherein the quick share link is accessible to the requesting user, or any other user to whom the requesting user sends the quick share link.

11. The computer program storage device as recited in claim 1, further comprising:
- receiving an electronic request through a user interface to share the three-dimensional model using a secure share link, wherein the secure share link comprises a user-specific URL for the three-dimensional model hosted at a web server; and
- sending the secure share link to one or more email addresses entered into the design software application.

12. At a web server in a computerized environment including a first remote client computer system that creates a three-dimensional computer model with a design software application, and a second remote client computer system, a method for securing sharing geometric and graphical aspects of a three-dimensional computer model at the second remote client computer system without requiring the second remote client computer system to have the design software application installed thereon, comprising:
- receiving at the web server, from a first remote client computer system, portions of geometry data and graphical aspect data relevant to outer or otherwise viewable surfaces extracted from a three-dimensional computer model, created using the design software application, which identifies minimum geometry data and graphical aspect data of the three-dimensional computer model;
- wherein the three-dimensional computer model is located within the first remote client computer system and the graphical aspect data is extracted from the three-dimensional computer model by the first remote client computer system;
- wherein extracting those portions of geometry data and graphical aspect data associated with outer or otherwise viewable surfaces of the three-dimensional computer model from one or more geometric computer model files corresponding to the three-dimensional computer model to create one or more separate files that represent less than all of the content of the identified one or more files, such that extracting the identified geometry data and graphical aspect data comprises;
  - identifying components and surfaces of the three-dimensional computer model that are not be viewable when rendered in the three-dimensional model including recognizing geometry data associated with at least one interior component, and
  - excluding data associated with the at least one interior component and other identified components and surfaces from the identified components and surfaces from the identified geometry data and graphical aspect data, such that data for components and surfaces that would not be viewable when rendered in the three-dimensional model is not stored in the one or more separate computer model files;
- storing the geometry data and graphical aspect data in one or more geometric computer model files at the web server;
- receiving one or more requests for the one or more geometric computer model files from the second remote client computer system; and
- sending the one or more geometric computer model files and one or more temporary viewer application files from the web server to the second remote client computer system, based on the created read-only one or more separated files of excluded data;
- wherein:
  - the one or more temporary viewer application files are configured to launch a temporary viewer application on the second remote client computer system; and
  - the temporary viewer application is configured to display the geometry data and graphical aspect data of the one or more geometric computer model files,
  - without receiving or incorporating at the web server or the first remote client computer system any changes to the sent one or more geometric computer model files or the three-dimensional computer model from a user of the temporary viewer application; and
  - providing a three-dimensional view of the geometry and graphical aspects of the three-dimensional computer model at the second remote client computer's display device through a capture and render software application unassociated with the design software application,
    - such that the a user is able to navigate each provided view at the second remote client computer system location without applying any changes to the provided view or the three-dimensional computer model, and wherein the capture and render software application is configured to delete the created one or more separate files from the second remote client display device upon the closing of the capture and render software application, and
    - such that the software application unassociated with the design software application automatically installs and removes the one or more temporary viewer application within the second remote client computer system.

13. The method as recited in claim 12, further comprising:
sending one or more executable instructions from the web server to the second remote client computer system,
wherein the one or more executable instructions are configured to cause one or more processors to automatically launch the temporary viewer application on the second remote client computer system.

14. The method as recited in claim 13, wherein the one or more executable instructions are configured to cause the second remote client computer system to store the one or more geometric computer model files in volatile memory at the second remote client computer system.

15. The method as recited in claim 13, wherein the one or more executable instructions are configured to cause the second remote client computer system to store the one or more temporary viewer application files in volatile memory at the second remote client computer system.

16. The method as recited in claim 12, wherein the one or more geometric computer model files comprise a limited extraction of all of the data originally created for the three-dimensional model at the first remote client computer system, and consist essentially of the geometry data, the graphical aspect data, and one or more context tags.

17. The method as recited in claim 12, further comprising sending a hyperlink containing a location of the one or more geometric computer model files from the web server to an email address associated with an intended viewer.

18. The method as recited in claim 17, wherein the hyperlink is accessible only through the associated email address.

19. The method as recited in claim 18, further comprising:
identifying that the intended viewer has confirmed the associated email address; and
upon identifying the confirmation, establishing a connection with the second remote client computer system; and
sending the one or more temporary viewer application files over the established connection to the second computer system.

20. At a client computer system in a computerized environment including a web server that hosts a three-dimensional computer model created by a design software application, a method for viewing geometric and graphical aspects of the three-dimensional computer model without requiring local installation of the design software application, comprising:
sending one or more requests to a web server for one or more geometric computer model files comprising portions of geometry data and graphical aspect data relevant to outer or otherwise viewable surfaces extracted from the three-dimensional computer model, created using the design software application, which identifies minimum geometry data and graphical aspect data of the three-dimensional computer model;
wherein extracting those portions of geometry data and graphical aspect data associated with outer or otherwise viewable surfaces of the three-dimensional computer model from one or more geometric computer model files corresponding to the three-dimensional computer model to create one or more separate files that represent less than all of the content of the identified one or more files, such that extracting the identified geometry data and graphical aspect data comprises;
identifying components and surfaces of the three-dimensional computer model that are not be viewable when rendered in the three-dimensional model including recognizing geometry data associated with at least one interior component, and
excluding data associated with the at least one interior component and other identified components and surfaces from the identified components and surfaces from the identified geometry data and graphical aspect data, such that data for components and surfaces that would not be viewable when rendered in the three-dimensional model is not stored in the one or more separate computer model files;
storing the geometry data and graphical aspect data in one or more geometric computer model files at a web server;
opening a temporary viewer application hosted by the web server, based on the created read-only one or more separated files of excluded data;
wherein:
the one or more temporary viewer application files are configured to launch a temporary viewer application; and
the temporary viewer application is configured to display the geometry data and graphical aspect data of the one or more geometric computer model files,
without receiving or incorporating at the web server any changes to the sent one or more geometric computer model files or the three-dimensional computer model from a user of the temporary viewer application; and
providing, from the web server, a three-dimensional view of the geometry and graphical aspects of the three-dimensional computer model to a remote client computer's display device through a capture and render software application unassociated with the design software application,
such that the a user is able to navigate each provided view at the remote client computer system location without applying any changes to the provided view or the three-dimensional computer model, and wherein the capture and render software application is configured to delete the created one or more separate files from the remote client display device upon the closing of the capture and render software application, and
such that the software application unassociated with the design software application automatically installs and removes the one or more temporary viewer application within the remote client computer system.

21. The method as recited in claim 20, further comprising receiving one or more executable instructions and one or more temporary viewer application files from the web server.

22. The method as recited in claim 21, further comprising automatically deleting the one or more executable instructions and the one or more temporary viewer application files upon closing of the temporary viewer application.

23. The method as recited in claim 20, further comprising storing the one or more geometric computer model files in volatile memory.

24. The method as recited in claim 23, further comprising automatically deleting the one or more geometric computer models upon closing of the temporary viewer application.

25. The method as recited in claim 20, wherein the extracted geometry data and graphical aspect data consists essentially of geometry data and graphical aspect data associated with outer or other otherwise viewable surface of the three-dimensional computer model.

26. The method as recited in claim 20, further comprising:
identifying one or more geometries that surround one or more vertices associated with the three-dimensional view of the geometry and graphical aspects of the three-dimensional computer model; and
providing a lighting value to one or more vertices based on the one or more surrounding geometries.

* * * * *